United States Patent [19]
Doshi et al.

[11] Patent Number: 5,291,481
[45] Date of Patent: Mar. 1, 1994

[54] CONGESTION CONTROL FOR HIGH SPEED PACKET NETWORKS

[75] Inventors: Bharat T. Doshi, Holmdel; Subrahmanyam Dravida, Highland Park; David S. Einstein, Branchburg; P. Harshavardhana, Freehold, all of N.J.

[73] Assignee: AT&T Bell Laboratories, Murray Hill, N.J.

[21] Appl. No.: 771,578

[22] Filed: Oct. 4, 1991

[51] Int. Cl.$^5$ .............................................. H04J 3/14
[52] U.S. Cl. ..................................... 370/60; 370/60.1; 370/79; 370/94.1
[58] Field of Search ................... 370/79, 60, 60.1, 94.1

[56] References Cited

U.S. PATENT DOCUMENTS

| | | | |
|---|---|---|---|
| 4,611,322 | 9/1986 | Larson et al. | 370/60 |
| 4,979,165 | 12/1990 | Dighe et al. | 370/60 |
| 5,014,265 | 5/1991 | Hahne et al. | 370/60 |
| 5,029,164 | 7/1991 | Goldstein et al. | 370/79 X |
| 5,163,046 | 11/1992 | Hahne et al. | 370/79 |

OTHER PUBLICATIONS

B. T. Doshi et al., "Congestion Control for Bursty Data in High Speed . . . ," Presented at ITC Seminar on Broadband Technologies, Morristown, N.J., Oct. 5, 1990.

B. Doshi et al., "Memory, Bandwidth, Processing And Fairness . . . ", ITC Seminar on Teletraffic and Datatraffic in a Period of Change, copyrighted in Jun. 1991, pp. 153–159.

Primary Examiner—Douglas W. Olms
Assistant Examiner—Russell W. Blum
Attorney, Agent, or Firm—Eugene S. Indyk

[57] ABSTRACT

Congestion in a high speed connection oriented packet network carrying bursty data and real time service is avoided by a novel in-call negotiation scheme for reserving bandwidth for real time calls and reserving buffer capacity for bursty calls.

For a real time call, a centralized call controller in each switch in the network determines which of its outgoing trunks has available to it the peak bandwidth needed to accommodate the call. Once one of these trunks is found, the call routing is set up so that the call is directed through that trunk and the peak bandwidth requirement of the call is allocated on that output trunk for the duration of the call.

The network contains one or more switches, each of which has a centralized call controller and a plurality of trunk controllers. The call controller routes calls from a plurality of input trunks to a plurality of output trunks, identifies kinds of calls, and allocates bandwidth on the output trunks. The trunk controllers perform in-call buffer reservation independent of the routing, identification, and bandwidth allocation performed by the call controller. This relieves the call controller of the extra burden of performing buffer reservation and it permits buffer reservation to be accomplished in a shorter period of time.

34 Claims, 20 Drawing Sheets

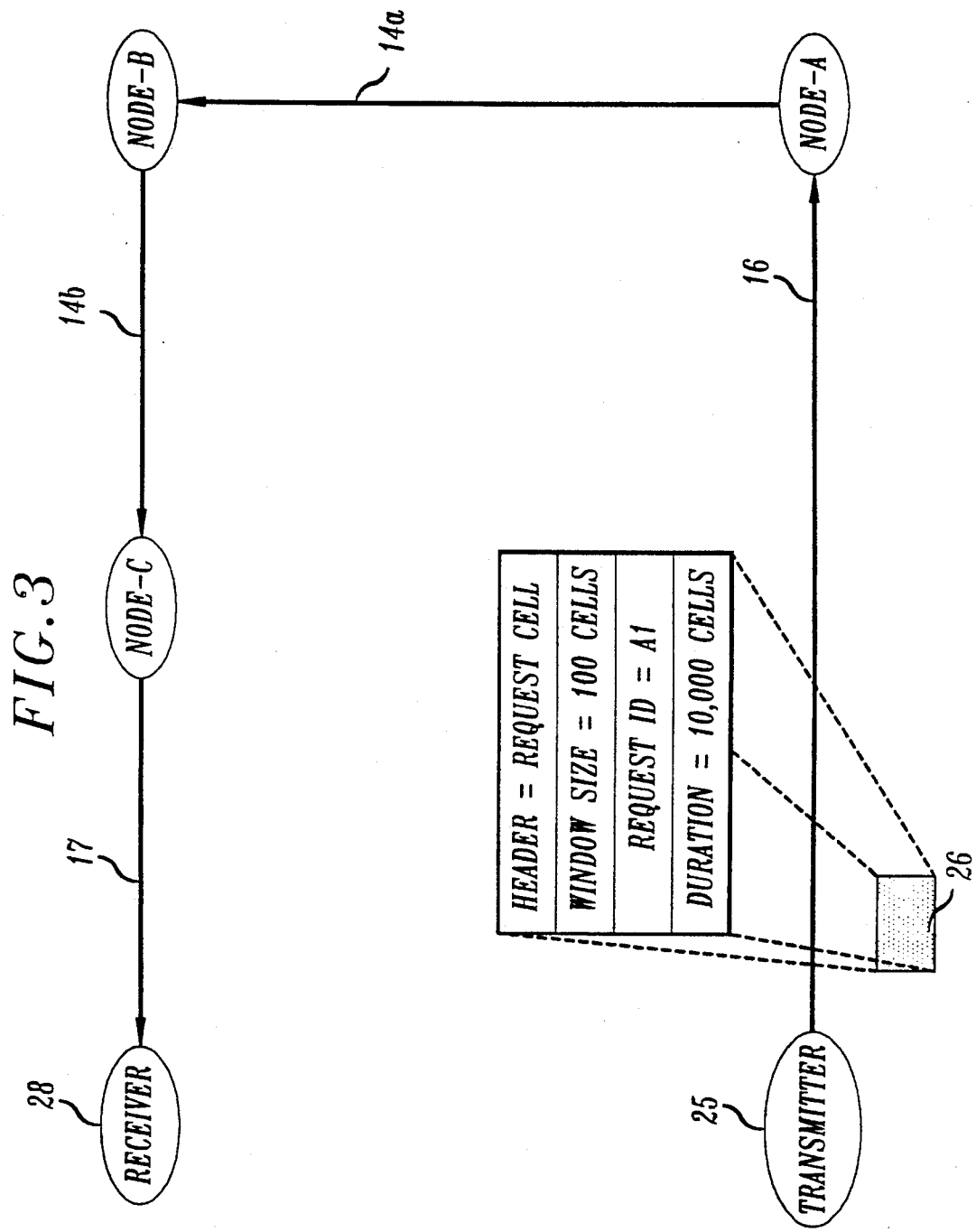

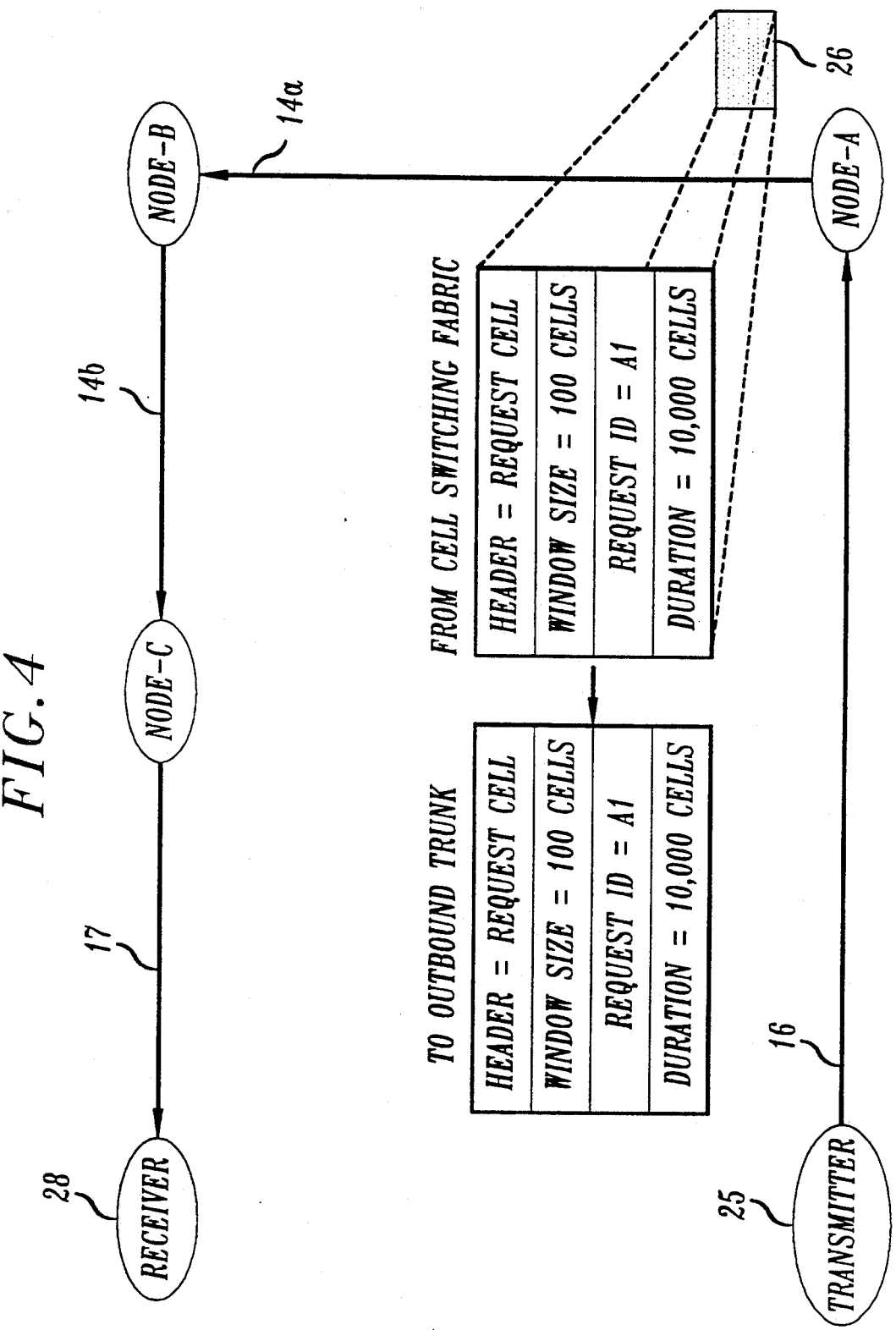

CALL SET-UP PACKET

| CALL ID | BANDWIDTH REQUIREMENT | TYPE + QOS |

CONGESTION CONTROL FOR HIGH SPEED PACKET NETWORKS

FIELD OF THE INVENTION

This invention relates to packet networks. More specifically, this invention relates to the control of congestion on high speed packet networks carrying a variety of different communications services, such as voice, video, and bursty data transmission.

BACKGROUND OF THE INVENTION

In response to rapidly increasing demand for a wide variety of telecommunication services, high speed, large capacity digital packet switching networks have been proposed. To meet these demands in an efficient and cost effective manner, a single packet network must be able to handle simultaneously different kinds of telecommunication services which have conflicting requirements. Moreover, these services must be accommodated in a manner which constitutes an effective and efficient use of available communication resources.

The proposed packet switching networks must be capable of handling real time services such as voice, video, and smoothly transmitted data transmissions without significant degrees of delay or jitter. These types of transmissions have short term (peak) bandwidth requirements which are substantially the same as their long term (average) bandwidth requirements. These transmissions are most conveniently handled by allocation of their bandwidth requirements in the network for the entire duration of those transmissions along the entire call routing path from the transmitter to the receiver.

Certain bursty data transmissions, on the other hand, do not have strong jitter or delay requirements. These kinds of transmissions, however, may involve periods of high rates of data transmission with long periods of little or no data transmission. For such transmissions, the short term (peak) bandwidth requirements can be very high compared to the long term (average) bandwidth requirements. Allocation of peak bandwidth, as in the case of real time services mentioned above, would be an inefficient use of the network, and is not necessary, for such bursty data transmissions not having stringent delay or jitter requirements. Although bursty data transmissions may not have strong jitter or delay requirements, they do have stringent loss requirements. Specifically, it is particularly important to keep the probability of packet loss very small. If such probability is not kept very small, the resulting packet retransmissions that are needed to complete the transmission can overwhelm the network and cause congestion collapse, particularly in high speed networks carrying a large amount of communication activity in which the amount of data in the network can increase dramatically with trunk speed.

Accordingly, there is a need for an effective congestion avoidance scheme, particularly, for very bursty data transmissions, which keeps the probability of packet loss very small. Furthermore, there is a need for such a congestion avoidance scheme which is compatible with congestion avoidance schemes used for real time transmissions and which is not wasteful of communications resources.

SUMMARY OF THE INVENTION

These needs are met by a communications network which has at least one switch containing a call controller which performs call routing for the entire switch and bandwidth allocation appropriate for real time telecommunications activities. The packet switch also has at least one trunk controller which performs an in-call buffer reservation operation in response to requests for bursty data transmissions. The buffer reservation operation is performed by the trunk controller indepedent of the operation of the call controller. This frees the call controller from performing this function and it allows the buffer reservation to be accomplished in a shorter period of time than if it were to be performed by the call controller. Performance of buffer reservation in short periods of time by a dedicated trunk controller independent of the call controller results in efficient use of the communications resources in the packet switch and on the trunk.

BRIEF DESCRIPTION OF THE DRAWINGS

FIGS. 3–13 illustrate the steps of an example of an in-call buffer reservation operation performed in the network of FIG. 1. Some pertinent aspects of a buffer reservation request packet used in this operation also are illustrated in FIGS. 3–13.

DETAILED DESCRIPTION

Figure 1:
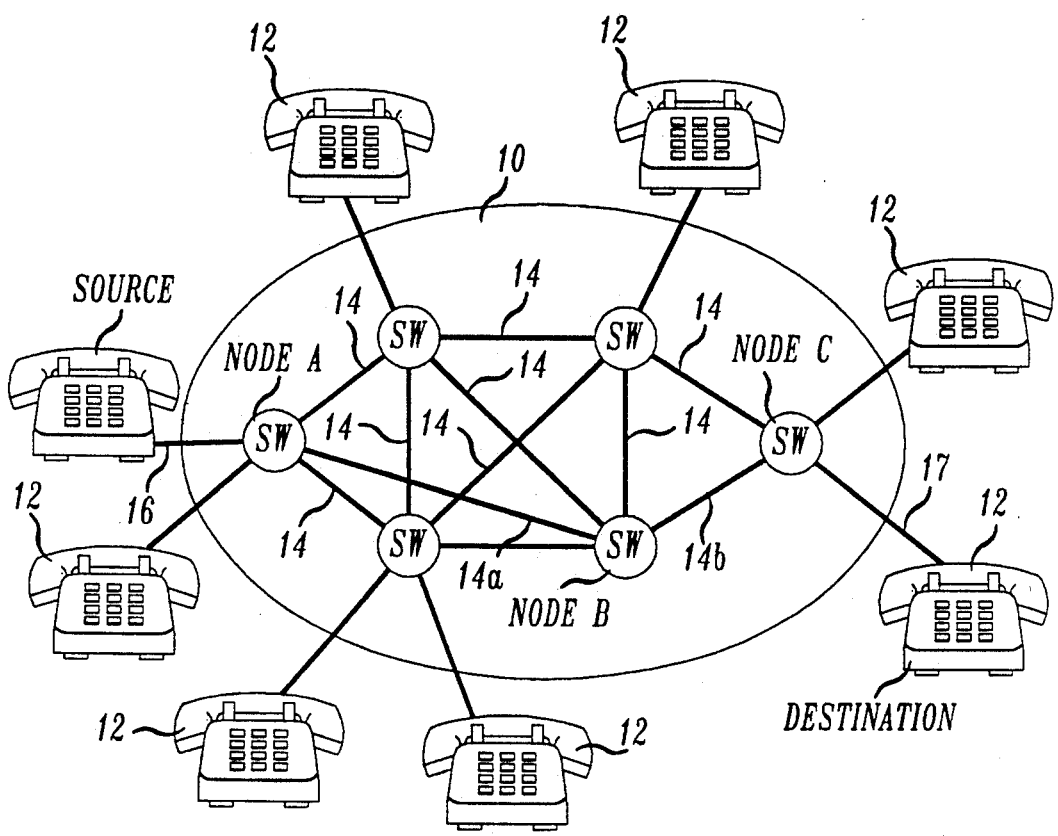
FIG. 1 shows an example of a packet switch network in accordance with this invention.

FIG. 1 shows an example of a packet switching network 10 in accordance with this invention. The packet switching network 10 serves to connect each of a plurality of customers all designated by reference numeral 12 to selected ones of the other customers connected to the network. Although all of the customers 12 in FIG. 1 have been illustrated symbolically with depictions of push button telephones, persons skilled in the art will appreciate that push button telephones are not the only devices which may communicate with the network 10.

Other devices which may communicate with the network 10 include, for example, other kinds of telephones, video equipment, and data sources such as computers.

Communication through the network 10 is accomplished at least, in part, by transmission of signals in the form of packets or cells. This application uses the term "packet" and "cell" interchangeably. The packet switching network 10 comprises a plurality of packet switches SW connected by a series of trunks 14. The switches SW and trunks 14, which configure themselves so as to connect each calling customer 12 to a selected one of the other customers in response to a request from that calling customer 12. For example, one of the customers designated "source" in FIG. 1 may be connected to another customer designated "designation" via certain ones of the packet switches SW and trunks 14 connecting those packet switches. For example, the source customer may be connected to the destination customer via the packet switches designated "node A", "node B", and "node C" and trunks 14a and 14b. After the source customer has been connected to the destination customer in this fashion, the source customer may communicate with the destination customer in a variety of ways. For example, there may be a one-way or two-way transmission of information between the two customers which may comprise voice, video, or data transmissions.

Figure 2:
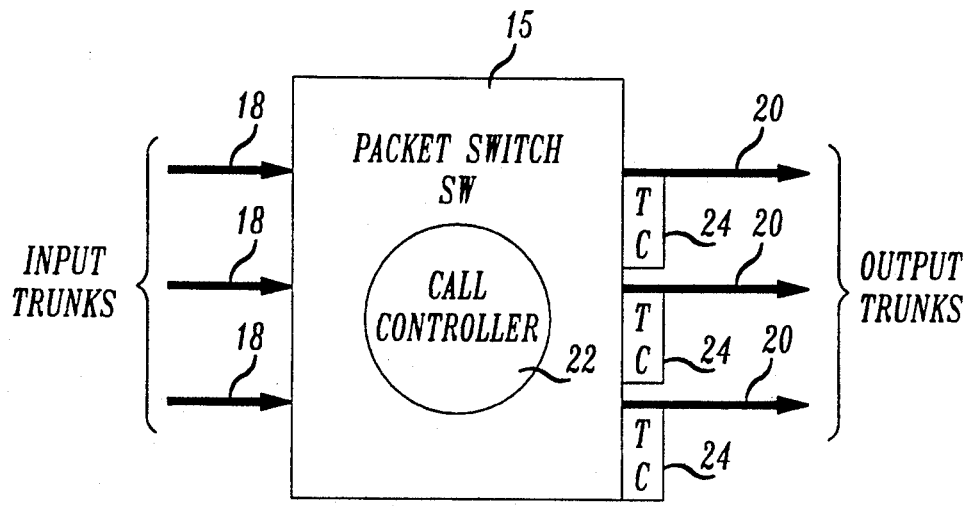
FIG. 2 shows in more detail one of the packet switch nodes shown schematically in FIG. 1.

FIG. 2 illustrates in more detail one of the packet switches SW shown in FIG. 1. That packet switch designated with a reference numeral 15 in FIG. 2, is connected to a plurality of input trunks 18. The packet switch 15 causes information appearing on the input trunks 18 to be switched to desired ones of a plurality of output trunks 20.

The packet switch 15 comprises a centralized call controller 22 which performs a number of functions. The call controller 22 is a means by which calls are accepted or denied based upon current work load handled by the switch and its outgoing trunks. The call controller 22 further performs a routing function for each of the calls appearing on the input trunks 18. In other words, the call controller is responsive to each call on the input trunks 18 and selects, at call setup, an appropriate output trunk 20 to which each call is directed. The call controller also performs an appropriate bandwidth allocation for the duration of real time calls such as voice and video transmissions and a certain minimum bandwidth allocation for bursty transmissions. This bandwidth allocation may be a certain fraction of the trunk's transmission capacity or a certain number of slots for each frame of transmission dedicated to a given real time call or bursty transmission. The bandwidth allocation may also be a certain number of bits for each frame of transmission. At the completion of a call, the call controller 22 also tears down the connection between the source customer and the destination customer. The call controller 22 is also responsive to the characteristics of each call to determine whether or not the call involves a real time transmission requiring peak bandwidth allocation for the call or the call involves a bursty transmission such as long and bursty computer file data transfers.

Each of the output trunks 20 has a dedicated trunk controller 24 separate and distinct from the centralized call controller 22. The trunk controllers 24 receive packets from the interconnect fabric in the switch 15 and buffer those packets in preparation for transmission of those packets on an associated trunk 18. The trunk controllers 24 also schedule the transmission of packets buffered in the trunk controller on their associated output trunks. As described below, the buffers in the trunk controllers 24 are partitioned into queues allocated or deallocated by the call controller 22 for accommodating real time transmissions. The buffers also comprise a shared buffer pool allocated or deallocated by the trunk controller 24 for accommodating bursty data transmissions.

When the source wishes to make a real time transmission, such as voice, video, or smoothly transmitted data, the call controller 22 first sets up the routing of the call and allocates the bandwidth required by the call for the entire duration of the call. In other words, the call controller 22 is responsive to a caller identification produced by the source and directed to one of the input trunks of the packet switch 15 to determine an appropriate output trunk 20 on which the call will be directed toward the destination. The call controller 22 also reserves an appropriate amount of bandwidth on the selected output trunk 20 to accommodate the real time transmission. If such a reservation is not possible on any of the relevant outgoing trunks, the call is denied by the call controller. It maintains that bandwidth allocation for the duration of the call.

As is apparent from FIG. 1, completion of a call from the source to the destination requires that a plurality of packet switches SW are involved in the routing of the call. Each one of those switches is responsive to the caller identification to determine an appropriate routing for the call. In the example noted above, the routing of the call comprises the source, input line 16, node A, trunk 14A, node B, trunk 14B, node C, output line 17, and the destination. Once the call routing has been set up by each of the call controllers 22 in nodes A, B, and C, the source can then transmit information to the destination via the route which has just been set up. By the same token, the destination can transmit information in the other direction to the source over this route. At the completion of the call, the call controllers 22 in each switch SW in the call route then tear down the connections between the source and destination.

In the case of bursty transmissions, the call controllers 22 and appropriate switches SW also set up the call route as in the case of real time transmissions. In addition, a certain minimal amount of bandwidth is allocated by each of the call controllers 22 using the same procedure as is used for real time transmissions. This minimal amount of bandwidth may be an amount of bandwidth needed to perform an in-call buffer reservation procedure described below, or it may be a somewhat larger amount of bandwidth to allow some actual data transmission. The in-call buffer reservation procedure is undertaken after the call routing operation is completed (and just when a burst of data arrives for transmission) to allocate an appropriate amount of buffer capacity in the appropriate outbound trunk controllers along the route of the call so that bursts of information packets may be transmitted without dropping any packets or causing congestion on the network. In this procedure, an amount of buffer capacity reserved for the bursty transmission is requested by an in-call set up packet. Typically, the set up packet requests an amount of buffer capacity to be reserved equal to a "window," which is the maximum number of unacknowledged packets a source can inject into the network. Reservation of such an amount of buffer capacity in each trunk controller along the call route will prevent packet loss.

The in-call buffer reservation may be carried out for each burst of data transmission and then canceled when the burst of transmission is complete. The packets from real time applications and bursty data applications are served differently in the trunk controller according to a discriminatory service scheduling procedure, described in more detail below, which allows tight jitter control of the packets from real time applications, avoids packet loss for bursty data applications, and allows very high trunk utilization. This service discrimination facilitates an important feature of the invention, namely, the performance of the routing function in the call controller 22 and the performance of the in-call buffer reservation procedure in the trunk controller 24 without any involvement of the call controller 22 in the in-call buffer reservation procedure carried out by the trunk controller 24. It is advantageous that the in-call buffer reservation procedure be accomplished without involvement of the call controllers 22 because the buffer reservation procedure can be performed by the trunk controllers independent of the call controllers 24 in a period of time which is considerably shorter than that which would be needed by the call controller to perform that same procedure. The performance of buffer reservation at the trunk controller also enables the convenient addition of features such as adaptive reservation.

Briefly, the source sends a special buffer reservation request packet along the route of the call which causes buffer capacity to be allocated to the call at each trunk controller 24 along the route of the call. The buffer reservation packet contains a representation of an amount of buffer capacity desired by the source so that the transfer of information between the source and the destination may be accomplished without loss of any packet.

Figure 2A:
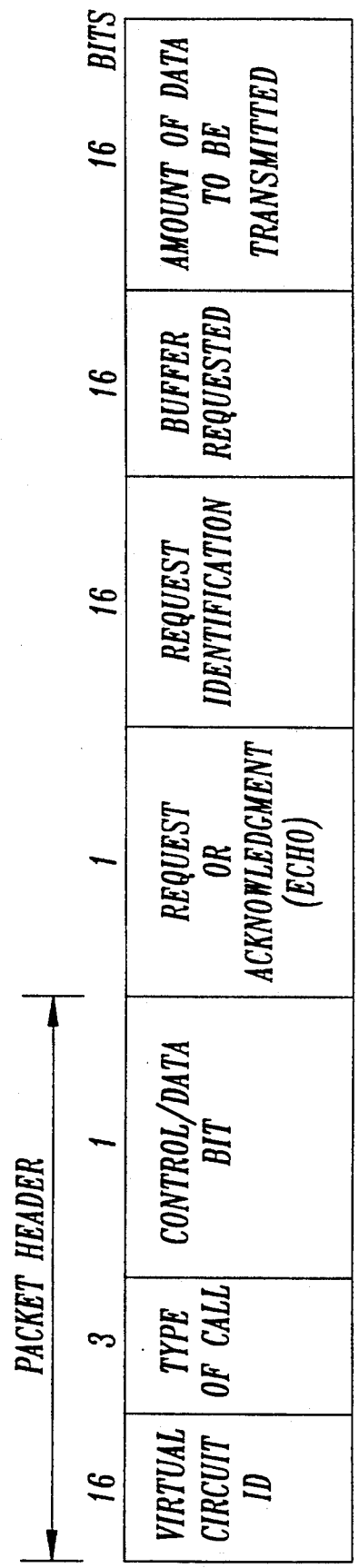
FIG. 2A illustrates a detailed example of the structure of a buffer reservation request packet.

A detailed illustration of the structure of an example of a buffer reservation request packet is shown in FIG. 2A. That example of a buffer reservation request packet comprises a header comprising a representation of identification for the virtual circuit over which the reservation request packet is to travel. The header also contains a designation recognized by the network of the type of call with which the reservation packet is associated. For example, the type of call designation may indicate that this call is a bursty data transmission. The packet header may also contain a control/data bit which, when set, notifies the the network that this is a special packet which packet may be read to and written onto by the network. In addition to the header, the reservation request packet may contain a designation recognized by the network indicating that the packet is either a buffer reservation request packet or an acknowledgement (echo) packet. The reservation request packet also contains a field which uniquely identifies the packet and another field which represents a requested amount of buffer capacity to be allocated to the call. Finally, the reservation request packet may contain a field having a designation which indicates the amount of data to be transmitted in the course of the call.

At each packet switch SW along the call route, the corresponding outbound trunk controller 24 in each switch SW determines if it has an amount of unallocated buffer capacity greater than or equal to the amount of buffer capacity requested in the reservation packet. If the trunk controller has an amount of buffer capacity greater than or equal to the request, the trunk controller 24 allocates that amount of buffer capacity to the call and passes the reservation packet unchanged to the next switch in the call route. If the trunk controller 24 does not have an amount of unallocated buffer capacity greater than or equal to the request, then it may refuse the request entirely by placing an indication of such refusal in the reservation packet, or it may overwrite the reservation request with a smaller amount of reserved buffer capacity, which the trunk controller is willing or able to allocate to the call. The trunk controller 24 then sends the modified reservation packet to the next switch SW along the call route.

Each switch along the call route performs the function described above. When the reservation packet reaches the destination, an acknowledgement packet is produced by the destination and sent back to the source via the same call route. The acknowledgement packet contains a representation of the smallest amount of buffer capacity allocated by the trunk controllers along the call route. As the acknowledgement packet travels back to the source, it causes each trunk controller which has allocated an amount of buffer capacity in excess of the smallest amount of allocated buffer capacity indicated in the acknowledgement packet to deallocate the excess allocated capacity. When the acknowledgement packet reaches the source, the source is notified of the amount of buffer capacity which has been allocated to the call along the route. The source may then control the number of unacknowledged packets (via a windowing mechanism) transmitted to the destination over the network so that the buffers allocated to the call do not overflow and cause packet loss and a need to retransmit the lost packet. The source, thus, regulates its window to be consonant with the reserved buffer capacity. The source may do this by incrementing a counter each time it sends a packet to the network and by decrementing that counter each time it receives an acknowledgement from the destination that a packet has been received. If the contents of the counter is such that there is an indication that the source has directed a number of unacknowledged packets to the network which may completely fill the allocated buffer capacity somewhere along the call route and which may result in a buffer overflow if any additional packets are directed to the network, then the source is prevented form transmitting any further packets to the network until it receives an acknowledgement that one of the packets already on the network has been received by the destination, which will cause the counter to be decremented below a limit indicating that the buffers are full. Thereafter the transmitter is permitted to send another packet into the network.

FIGS. 3–13 sequentially illustrate a detailed example of a buffer reservation procedure in accordance with this invention. Pertinent parts of the reservation request and acknowledgement packets used in the reservation procedure are illustrated in FIGS. 3–13.

FIG. 3 shows a transmitter 25 at the source of the call sending a reservation packet 26 along a call routing which comprises the previously mentioned input line 16, node A, trunk 14a, node B, trunk 14b, node C, and output line 17. The reservation packet 26 in this example comprises a header which indicates that this packet is a reservation packet. The packet also contains a designation of requested transmission window, in this case a transmission window of 100 cells, which represents the number of unacknowledged packets which may be accommodated on the network along the call routing. The window size also represents an amount of buffer capacity which is being requested by the transmitter to be allocated by each of the trunk controllers 24 along the route of the call. The reservation packet 26 contains information which uniquely identifies the call with which it is associated. The reservation packet 26 may also contain a representation of the expected duration or amount of information to be transmitted during the call, in this example, 10,000 packets.

The transmitter assembles this reservation packet 26 as shown schematically in FIG. 3 and sends it along input line 16 to the switch designated as node A, as shown in FIG. 4. The reservation packet 26 is received on an inbound trunk of node A and is directed through the packet switching fabric in node A and to the trunk controller 24 in node A which is a part of the call routing. The trunk controller 24 in node A checks to see if it has an amount of unallocated buffer capacity equal to or greater than the window size in the reservation packet 26. It is assumed in FIG. 4 that the trunk controller has at least that amount of unallocated buffer capacity. The trunk controller in node A, therefore, allocates the requested 100 packets of buffer capacity to call signals having the identification contained in the reservation packet and passes the reservation packet 26 unchanged node B along trunk 14A as shown in FIG. 5.

Figure 5:
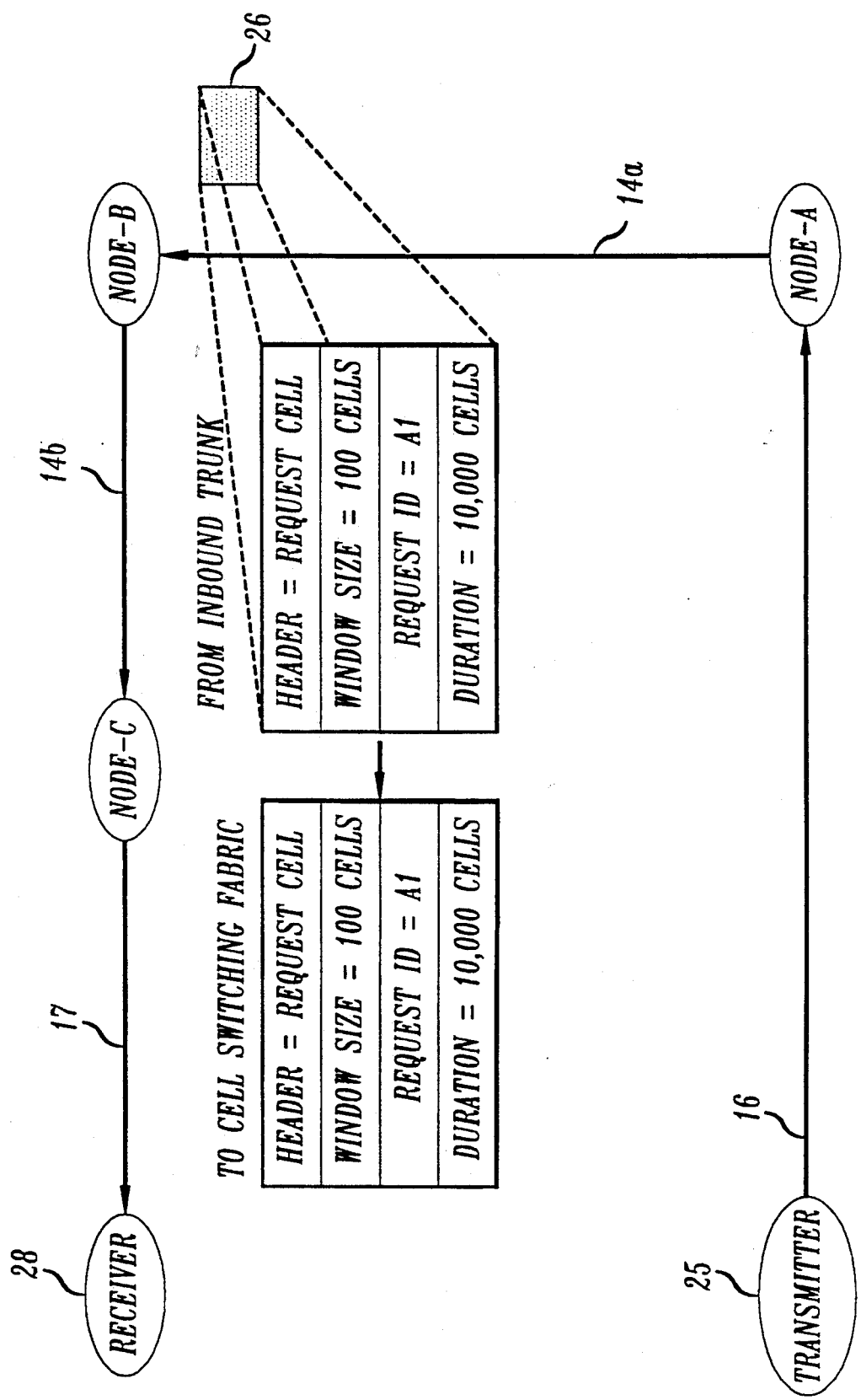
Figure 6:
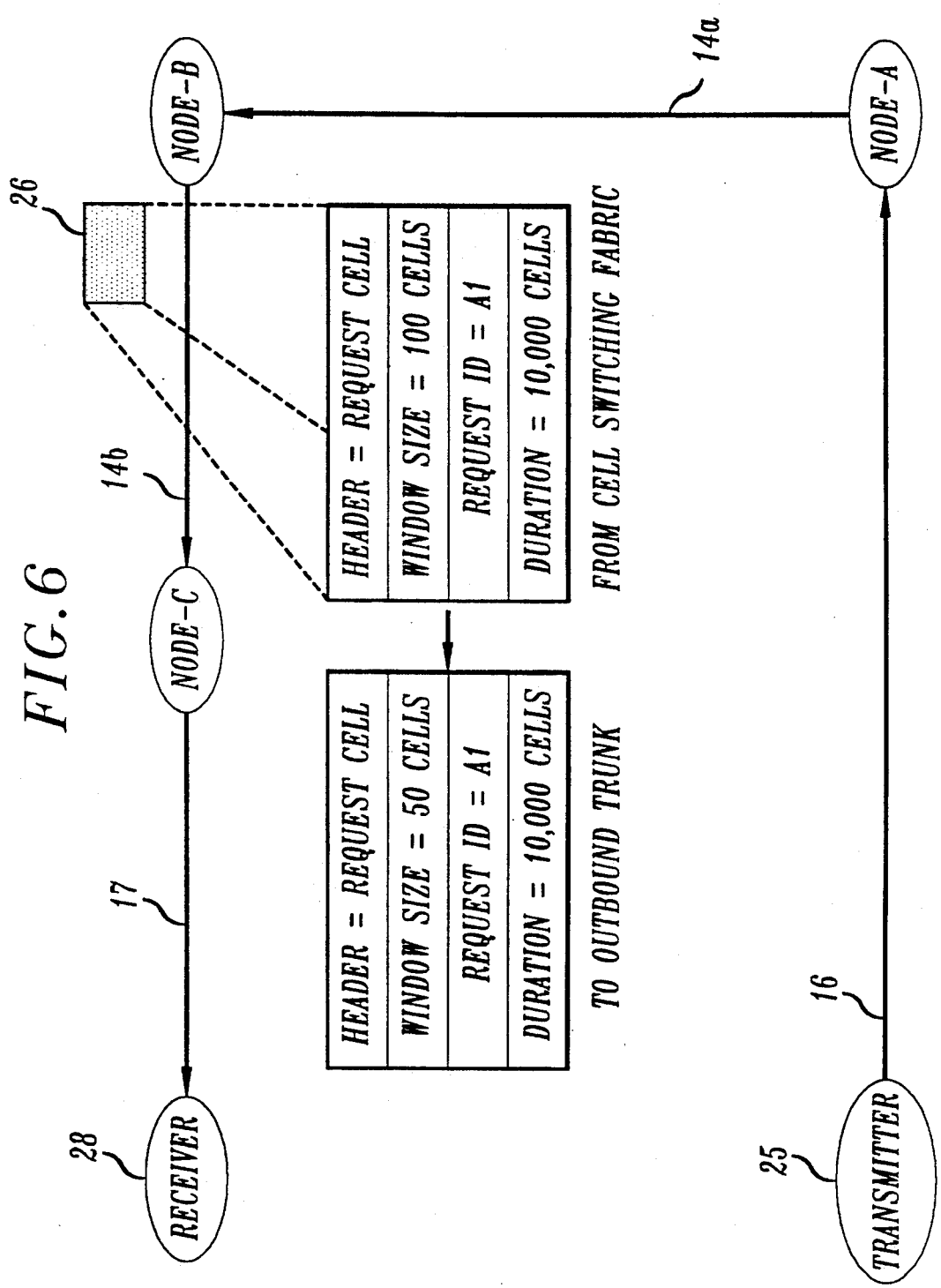
Figure 7:
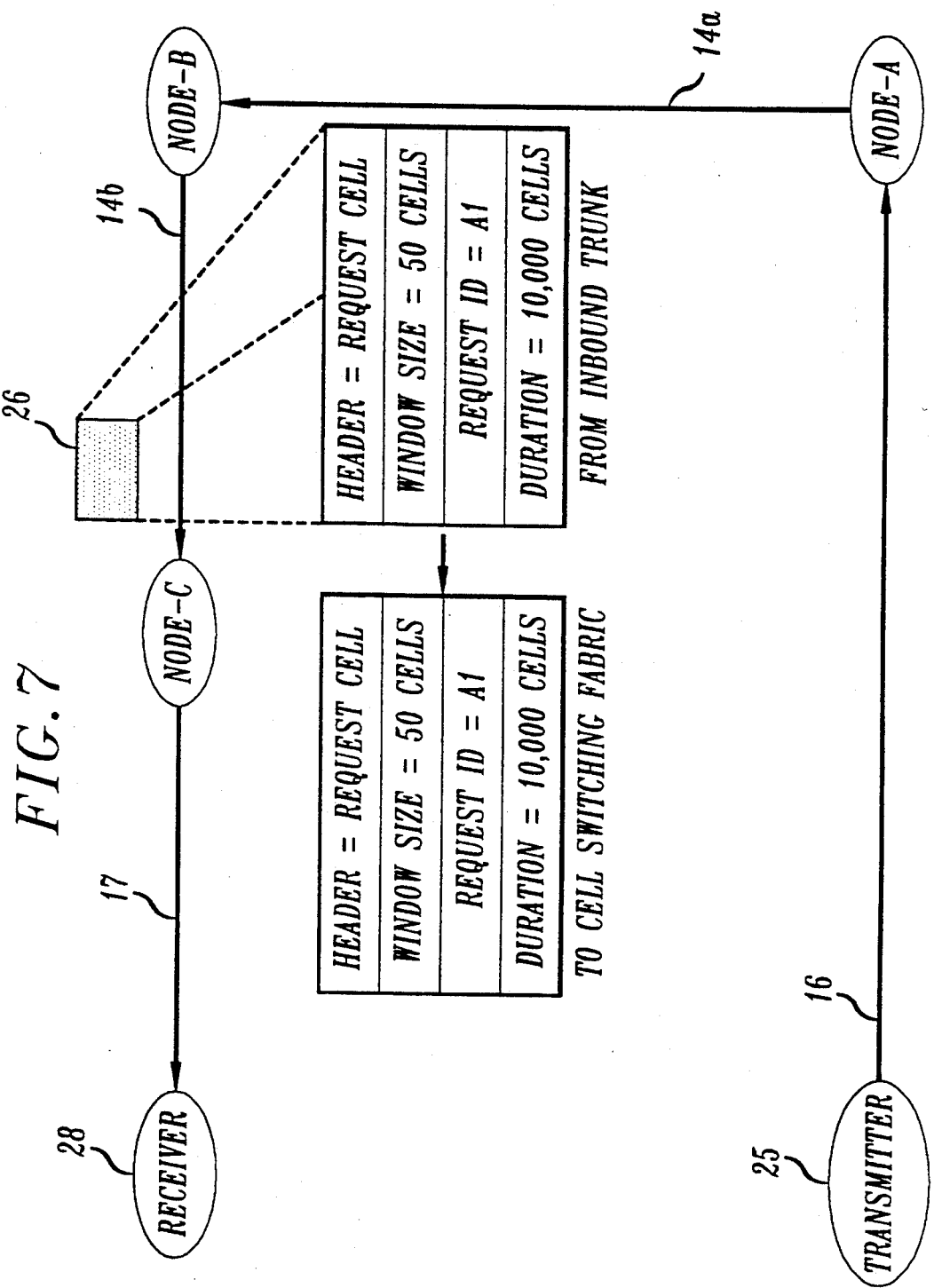

The reservation packet arrives in the inbound direction on trunk 14a and is passed from that inbound trunk 14a to the packet switching fabric of node B, as indicated in FIG. 5. The packet is directed from the packet switching fabric of node B to an appropriate outbound trunk controller 24 in node B. The outbound trunk controller 24 in node B in this example is assumed to not have the requested buffer capacity of 100 packets. In this example, it only has 50 packets worth of unallocated buffer capacity. In a situation such as this, where the trunk controller 24 does not have the requested capacity, the trunk controller 24 is allowed to modify the request in the reservation packet 26 by overwriting the window size designation in the reservation packet 26 with an indication representing a smaller amount of buffer capacity the trunk controller can accommodate. In the example described here, the trunk controller 24 in node B may overwrite the window size of 100 packets with a designation of a window size representing 50 packets as shown in FIG. 6, thereby reducing the buffer capacity requested at each successive node through which the modified reservation packet passes. In addition to overwriting the window size parameter in the reservation packet 26, the outbound trunk controller 24 in node B also reserves an amount of buffer capacity corresponding to the new window size parameter for this call and then directs the modified reservation packet 26 in the outbound direction along trunk 14b toward node C as shown in FIG. 7.

Figure 8:
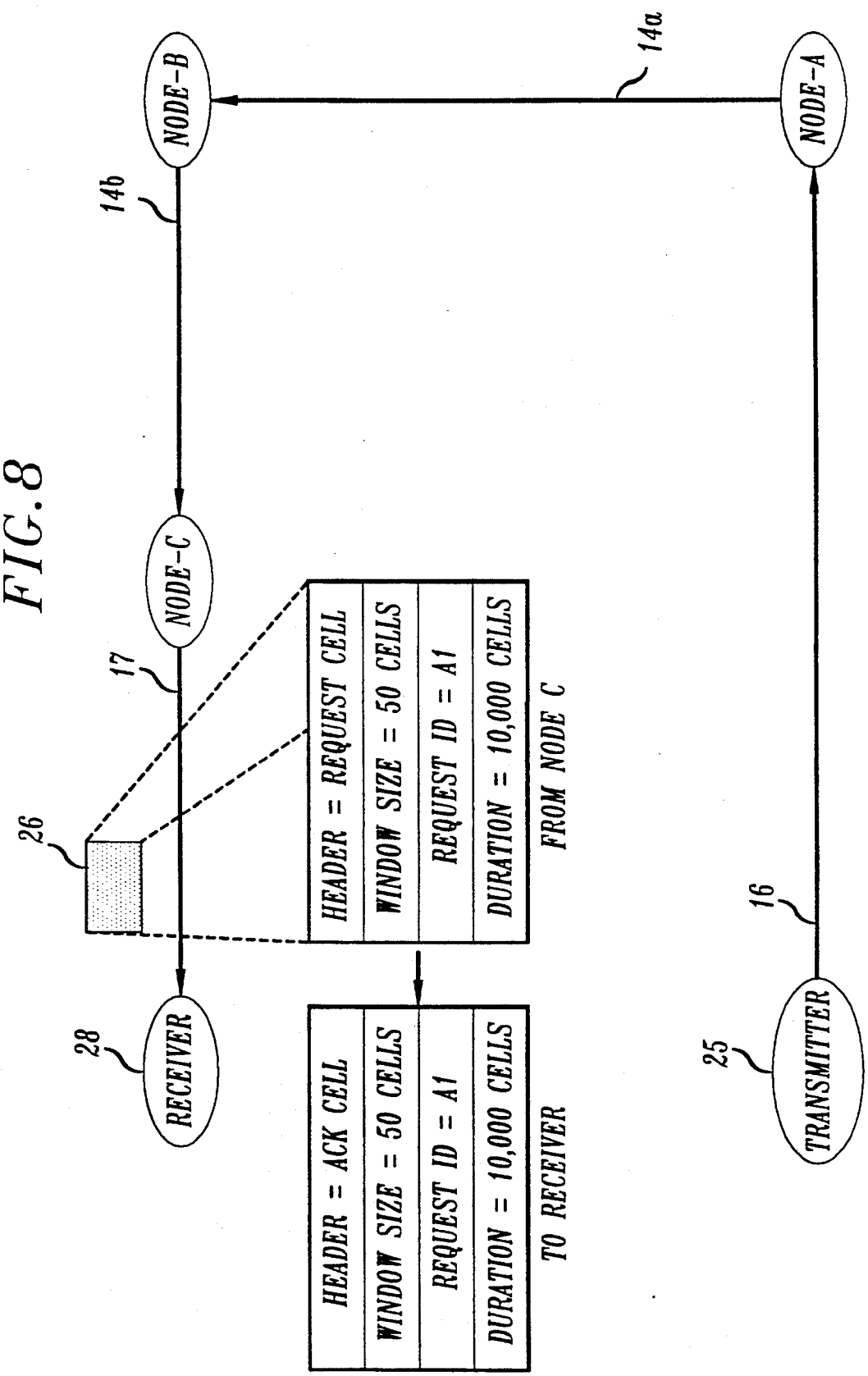

The modified reservation packet 26 is received on the inbound end of trunk 14b connected to node C and is directed through the packet switching fabric of node C. The packet is directed from the cell switching fabric of node C to the appropriate outbound trunk controller 24 in node C. The outbound trunk controller 24 in node C checks to see if it has an amount of unallocated buffer capacity greater than or equal to the new window size in the reservation packet 26 node C has just received from node B. In this case, it checks to see if it has unallocated buffer capacity corresponding to a capacity of 50 packets. If it does have such unallocated capacity, it passes the reservation packet 26 unchanged to the receiver 28 over output line 17, as shown in FIG. 8, and it reserves the buffer capacity requested by the reservation packet 26. If the outbound trunk controller 24 in node C does not have the requested capacity, namely, 50 cells in this example, it may perform an overwrite operation similar to that performed by node B.

In appropriate situations, when one of the outbound trunk controllers 24 in the nodes comprising the call routing do not have a sufficient unallocated buffer capacity to properly accommodate the attempted call, either because it has no buffer resources to devote to the call or the amount of buffer it has is so small that the resulting rate of data transfer will be for some reason too slow to properly carry out the transmission, that node may indicate a refusal of the request by overwriting the window size in the reservation packet 26 with a suitable designation of such refusal. The trunk controller 24 then may pass the reservation packet to the next node in the call routing as before. For example, the node refusing the request for buffer capacity may place an indication of a zero window size in the reservation packet 26 which will serve to prevent any future allocation of buffer capacity for the call in the other packet switches in the network, to deallocate existing buffer resources which have already been allocated to the call and to notify the receiver and the transmitter that the buffer reservation request has been refused.

When the reservation packet 26 has reached the receiver 28, as shown in FIG. 8, the receiver 28 checks if it can allow the window size currently present in the reservation packet and assembles an acknowledgement packet 30, which may comprise a header identifying the packet as an acknowledgement packet, a window size indication equal to the window size indication in the reservation packet as it appeared when it arrived at the receiver, or as it was modified by the receiver, a request identification which is the same as the request identification in the reservation packet 26 which arrived at the receiver, and an indication of the duration of the call equal to the duration indicated in the reservation packet 26. If the receiver cannot support the window size in the reservation packet, it can reduce it, to zero if necessary, just like the network nodes do.

Figure 9:
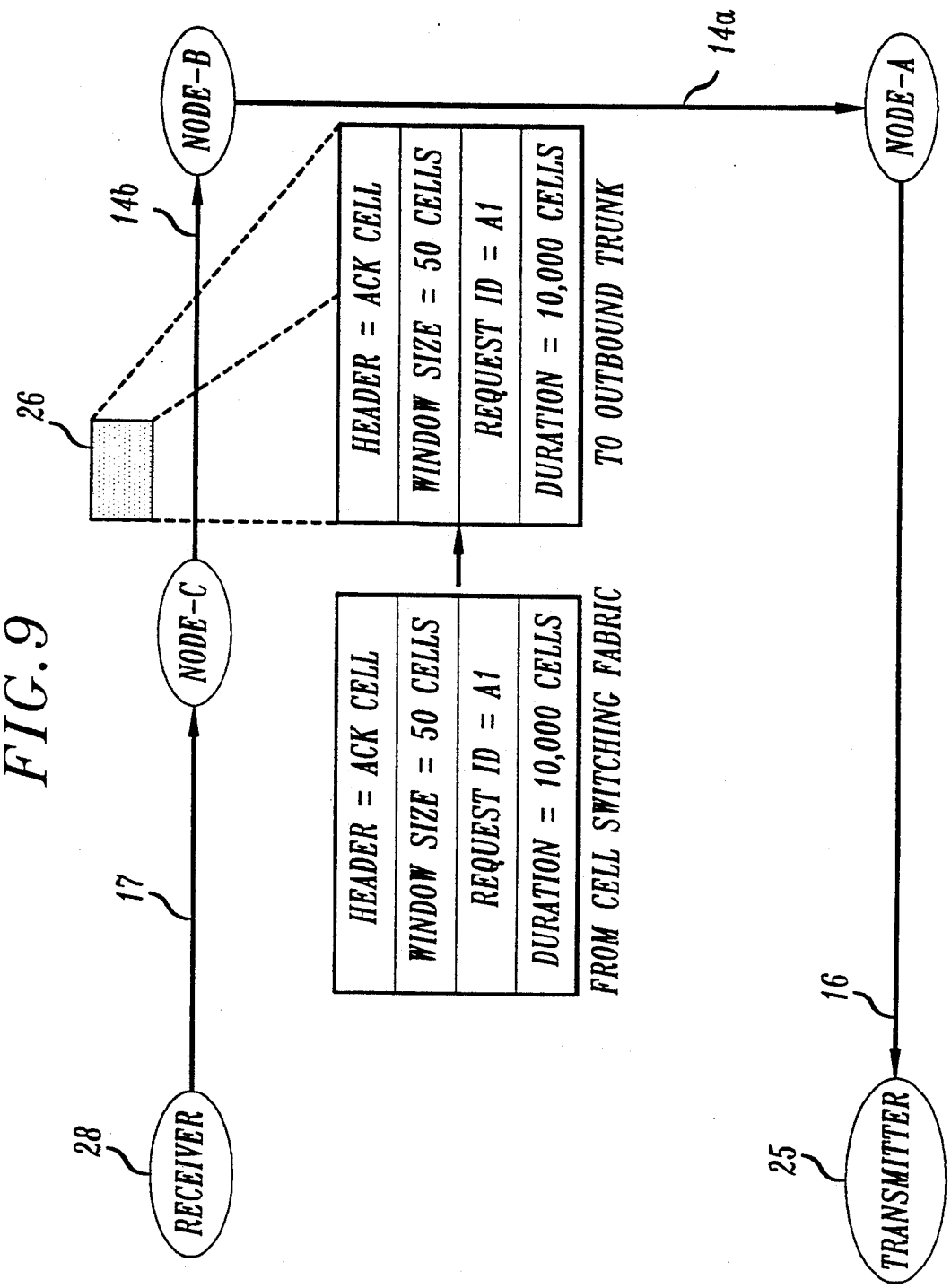
Figure 10:
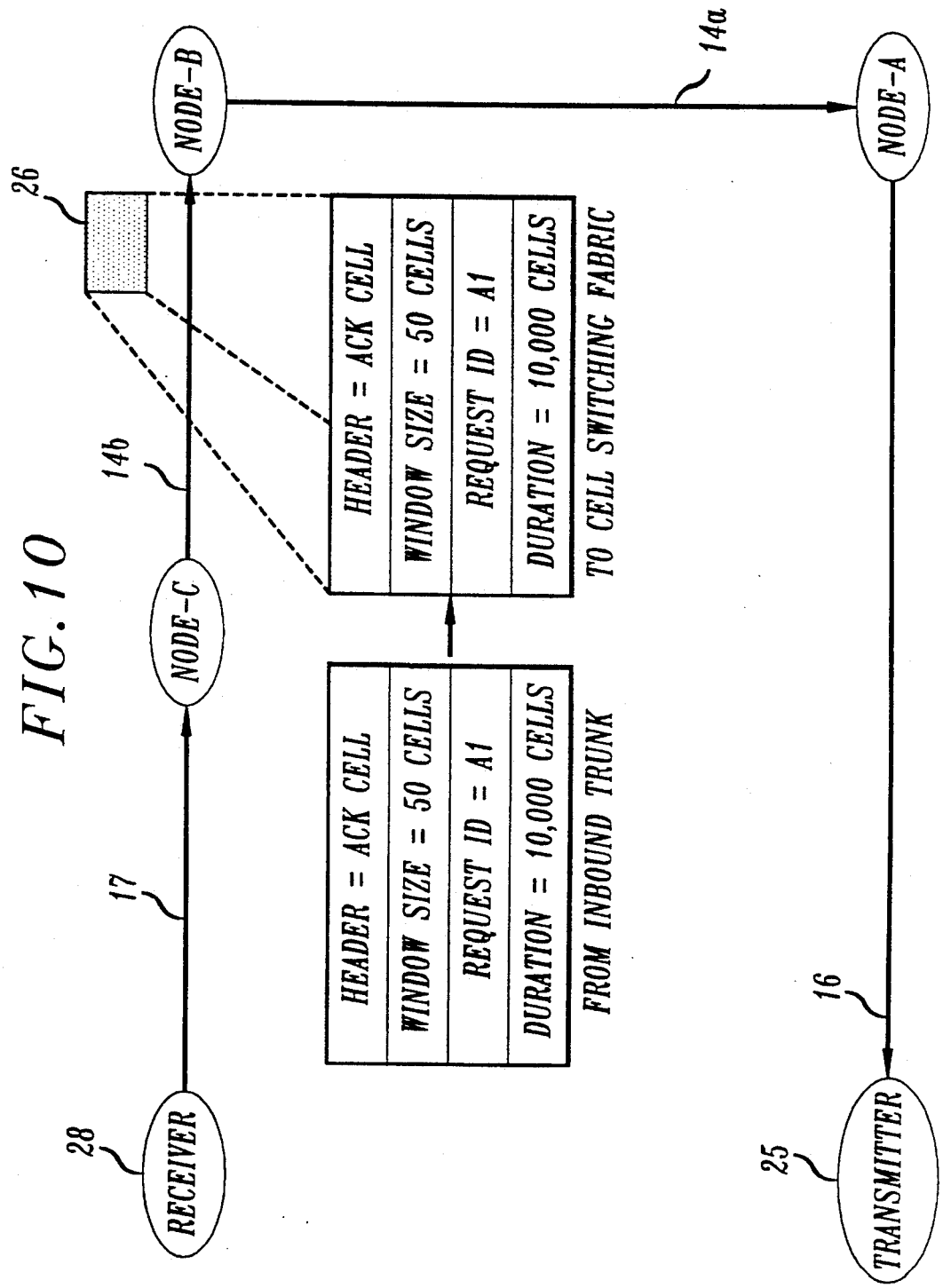

The receiver 28 then sends this acknowledgement packet 30 to node C over line 17 as shown in FIG. 9. The acknowledgement packet is directed through the switching fabric in node C and to the trunk controller 24 for trunk 14b. The trunk controller 24 in node C checks to see if it had allocated buffer capacity to this call greater than the window size designation in the acknowledgement packet 30. In this example, node C did not allocate an amount of buffer capacity greater than the current 50 packet designation in the acknowledgement packet. The amount of buffer capacity allocated by the trunk controller 24 in node C is, therefore, left unchanged and the acknowledgement packet 30 is sent to node B via trunk 14b, as shown in FIG. 10, through the switching fabric of node B to the trunk controller 24 for trunk 14a.

Figure 11:
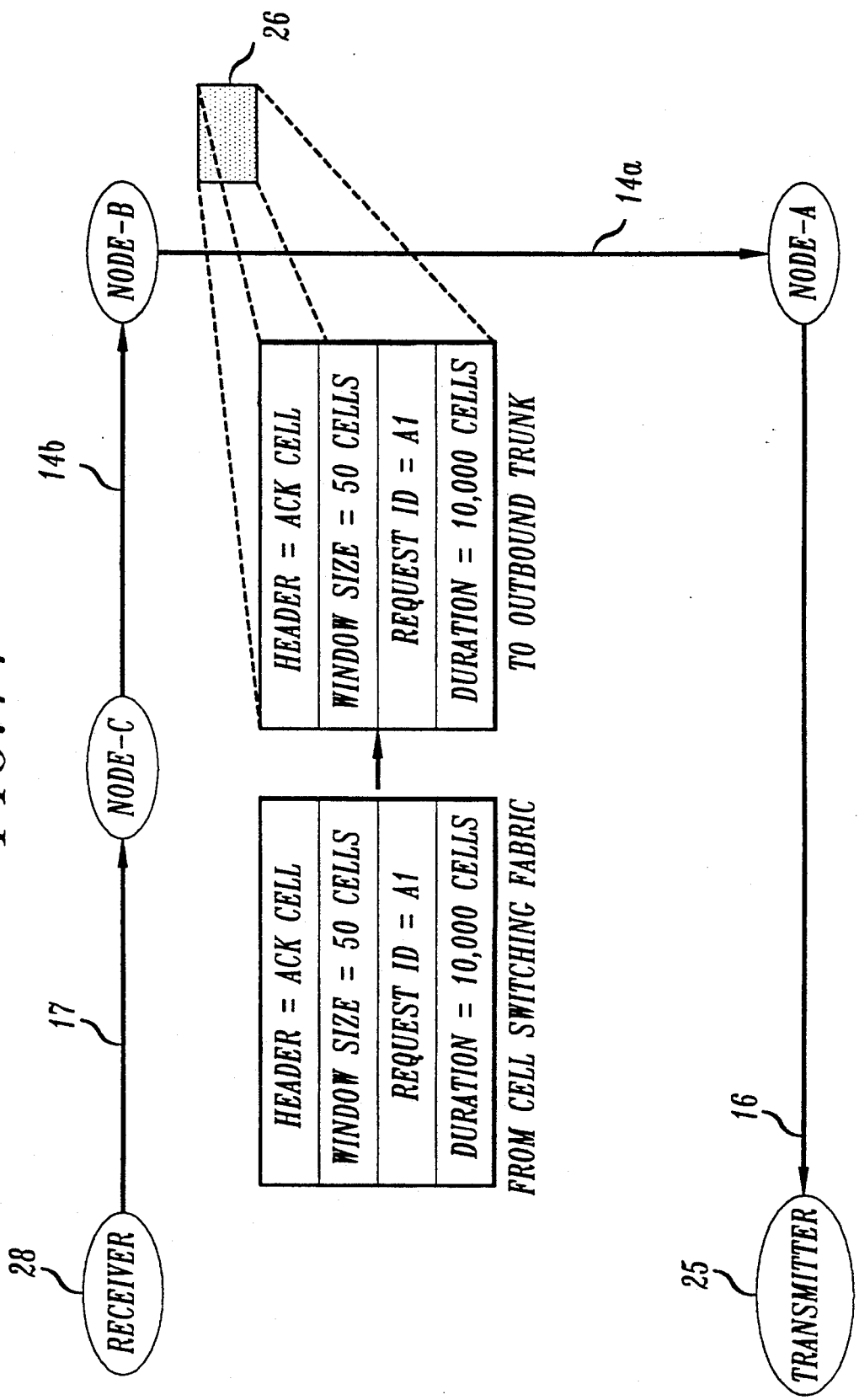
Figure 12:
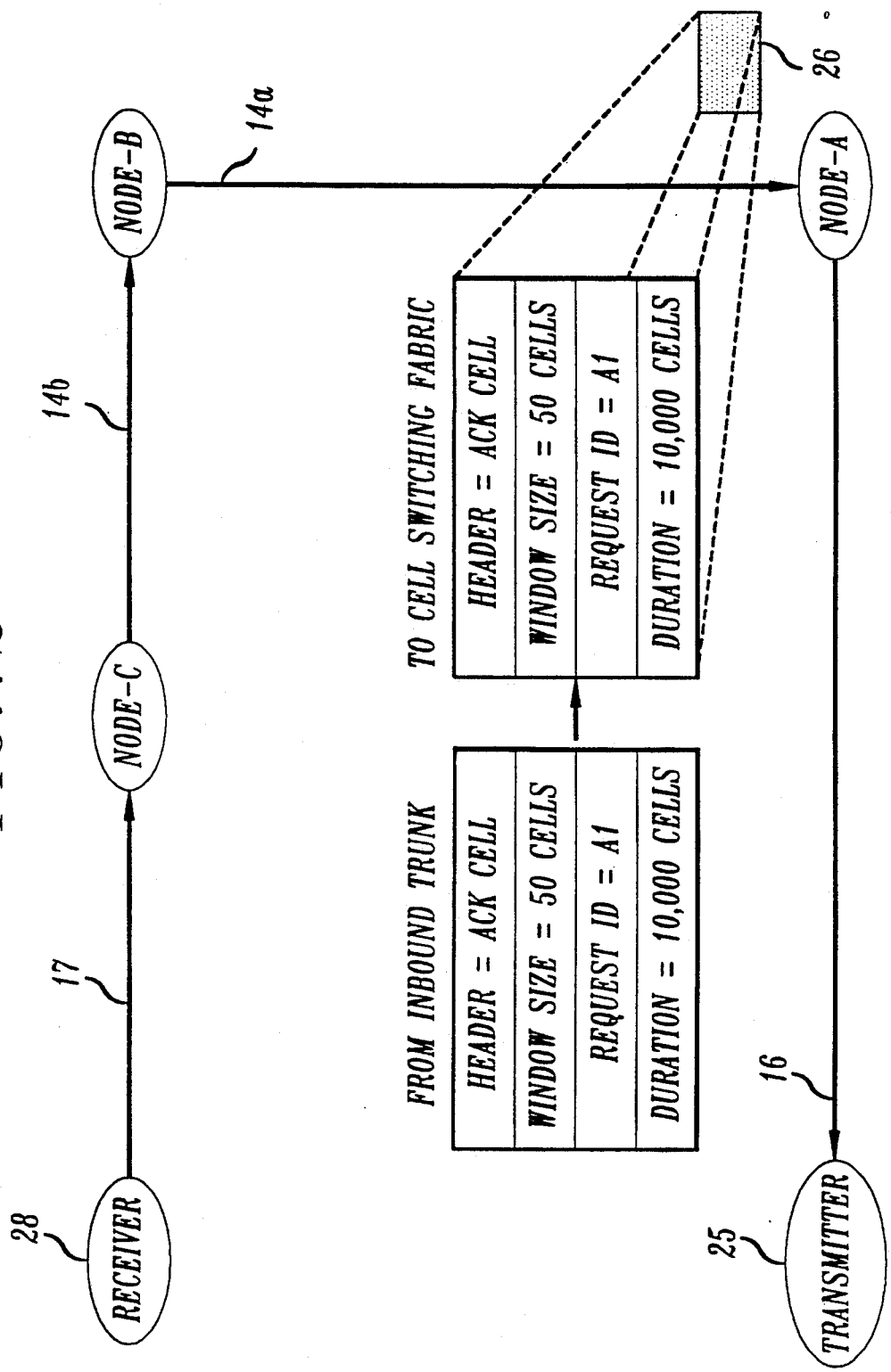

That trunk controller 24 of node B also checks to see if it had allocated buffer capacity to this call which is greater than the window size designation in the acknowledgement packet 30. Like node C in this example, node B did not allocate an amount of buffer capacity greater than the current 50 packet designation in the acknowledgement packet 30, and node B similarly does not change the amount of buffer capacity it had allocated. It then passes the acknowledgement packet to node A, along trunk 14a, to the trunk controller 24 and through the switching fabric of node A to the line 16 and the transmitter 25, as shown in FIGS. 11, 12, and 13.

Node A likewise checks to see if it had allocated buffer capacity to this call which is greater than the window size designation in the acknowledgement packet 30. In this example, node A had allocated an amount of buffer capacity, namely, 100 packets worth of buffer capacity, which is greater than the window size designation in the acknowledgement packet 30, namely, 50 packets. In this situation, node A deallocates the amount of buffer capacity in excess of the window size designation in the acknowledgement packet 30, that is, it deallocates 50 packets worth of buffer capacity from this call, leaving a 50 packet allocation in node A.

Figure 13:
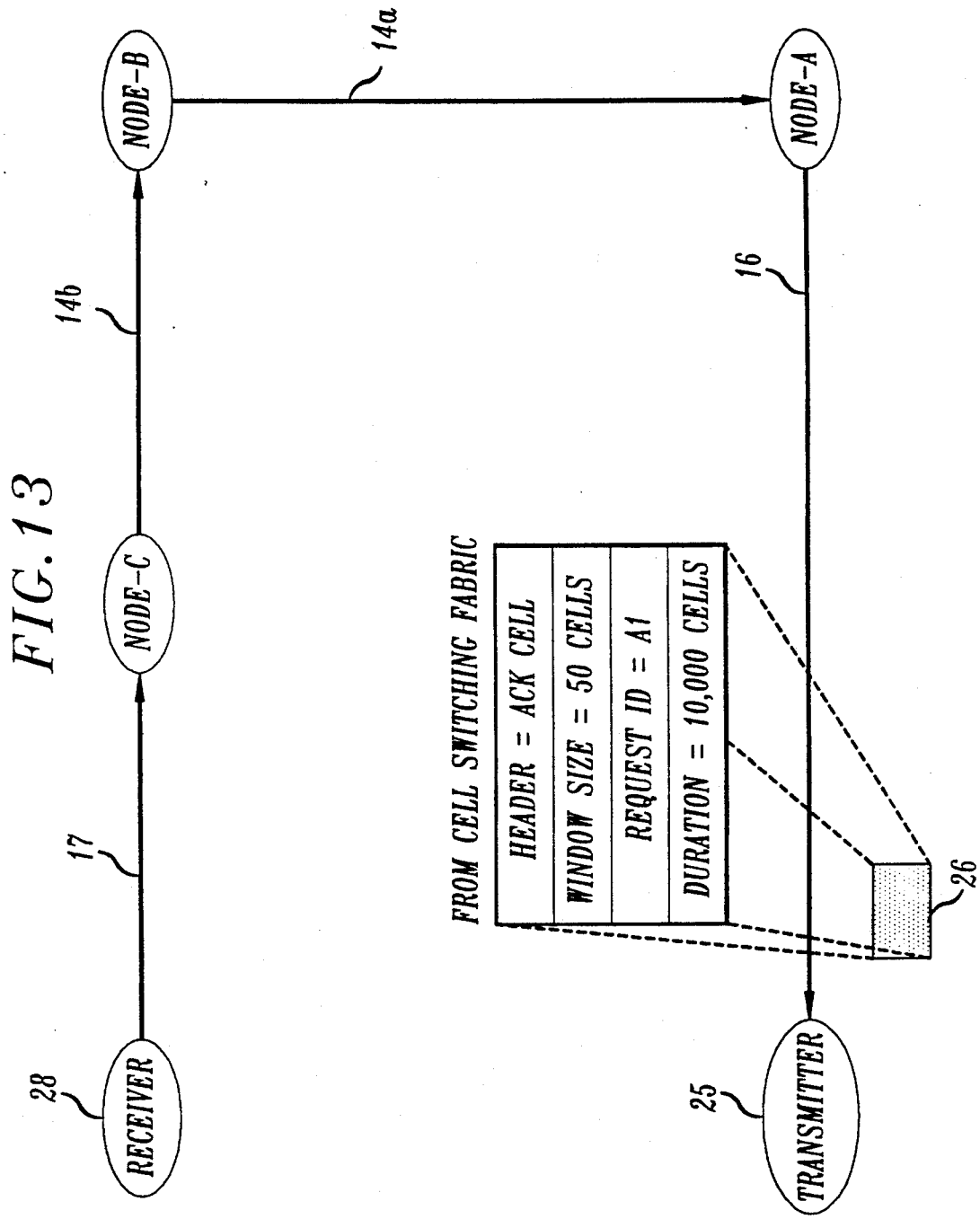

As shown in FIG. 13, node A then transmits the acknowledgement packet 30 to the transmitter 25 via line 16. The acknowledgement packet 30 thereby notifies the transmitter 25 of the amount of buffer capacity allocated in each of the nodes comprising the call routing. This notification is used by the transmitter 25 to regulate the packet transmission to the network so that none of the buffers allocated to the call along the call routing experiences an overflow situation. This may be achieved by the counter mechanism described above. There, thus, will be no loss of packets during the transmission. There, thus, will also be no requirement for retransmission and needless waste of resources. There also will be no congestion in the network caused by this call.

In a situation where one or more of the nodes along the call routing has refused the buffer request entirely, the acknowledgement packet 30 produced and sent to the network by the receiver 28 will cause each of the nodes in the call routing to deallocate entirely the amount of buffer capacity which may have been allocated prior to refusal of the call. The acknowledgement packet 30 will also serve as a notification to the transmitter that the call has been refused and that completion of the transmission ought to be attempted at some later time.

Figures 14, 14A:
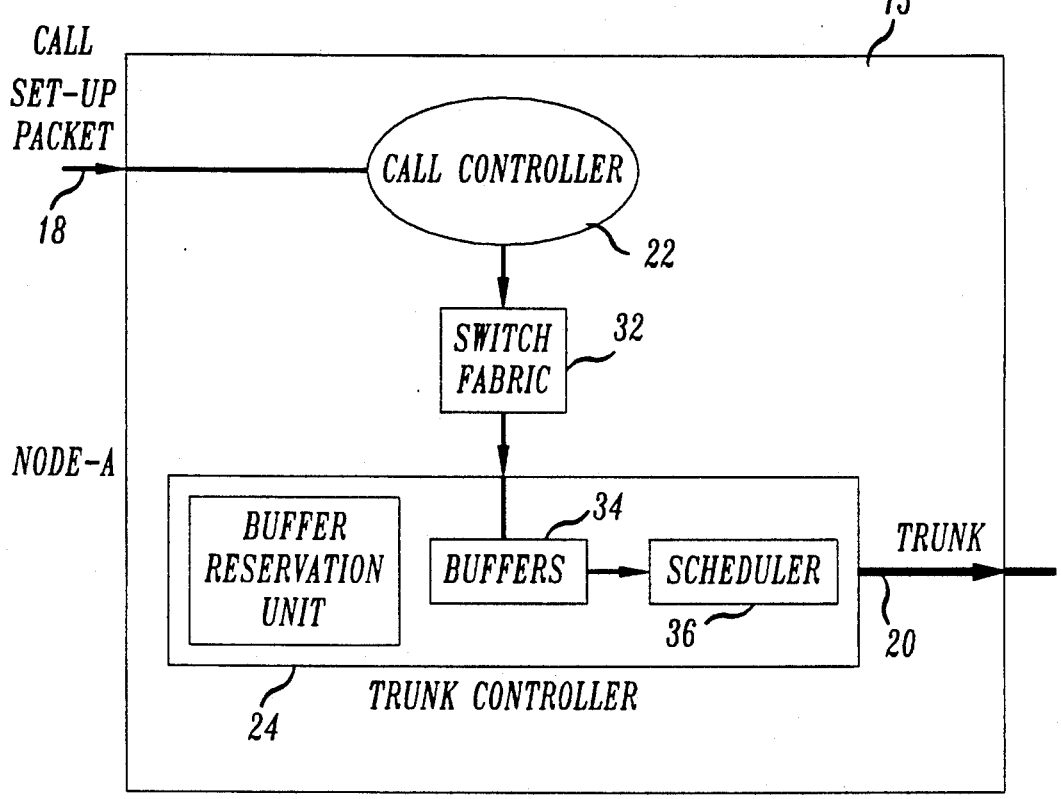
FIG. 14 illustrates message flow through one of the trunk controllers in the nodes of FIG. 1 in response to the appearance of a call set-up packet on one of the input trunks of the node.
FIG. 14A illustrates an example of the structure of a call set-up packet.

FIG. 14 illustrates what happens in one of the nodes, for example, in node A, at the time of call setup. The transmitter initiates a call by directing a call setup packet to node A via line 18. As shown in FIG. 14a, the call setup packet may contain an identification which can be an indication of the telephone number (or other form of designation) of the transmitter 25 and the telephone number (or other form of designation) of the receiver 28. The call setup packet may also contain an indication of the required bandwidth for the call and a type or quality of service designator for the call. The type or quality of service designator may be the indicator by which the kind of the call can be identified by the call controller 22 and can be classified as either a real time transmission requiring call routing and allocation of the bandwidth by the call controller 22 or a bursty type transmission requiring call routing and minimum bandwidth allocation performed by the call controller with in-call buffer reservation performed later by trunk controllers 24 for each transmission burst. The call setup packet is directed through the call controller 22 and switch fabric 32 to the trunk controller 24 for an appropriate trunk 20 selected by the call controller 22 in accordance with its routing decision. Specifically, call setup packet can be transmitted through the switch fabric 32 to appropriate buffers 34 in the selected trunk controller 24 where a scheduler 36 at an appropriate time empties the buffers in which the call setup packet resides so that the call setup packet can be transmitted to the next node in the call routing over trunk 20.

Figure 15:
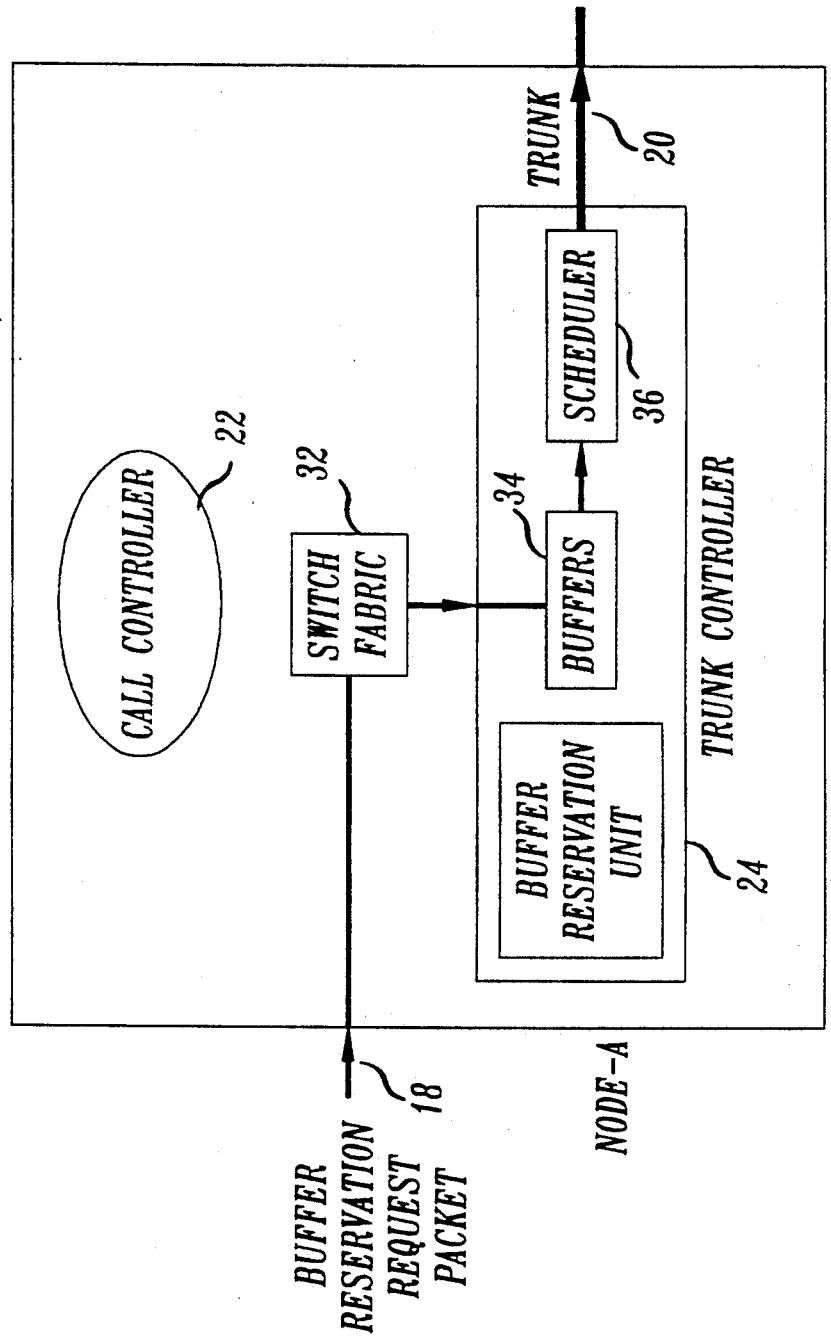
FIG. 15 illustrates message flow through one of the trunk controllers in the nodes of FIG. 1 in response to the appearance of a buffer reservation request packet on one of the input trunks of the node.

FIG. 15 illustrates what happens in node A in response to the arrival of a buffer reservation packet 26 produced in the course of completing a reservation request involving a bursty transmission. The reservation packet is directed through the switch fabric 32, in accordance with the routing set up by the call controller 22, to an appropriate trunk controller 24. Specifically, the reservation packet is sent from the switch fabric 32 to a buffer reservation unit 38 in the trunk controller 24 which compares the requested buffer allocation in the reservation packet with the amount of unallocated buffer capacity currently available in the trunk controller 24. The buffer reservation unit 38 performs the previously described function of allocating the requested buffer capacity, allocating a reduced amount of buffer capacity, or indicating a refusal of the call. The buffer reservation unit 38 directs either an unchanged reservation packet, a modified reservation packet, or a reservation packet indicating call refusal through appropriate buffers 34 in the trunk controller 24 to the trunk 20 via the operation of the scheduler 36.

Figure 16:
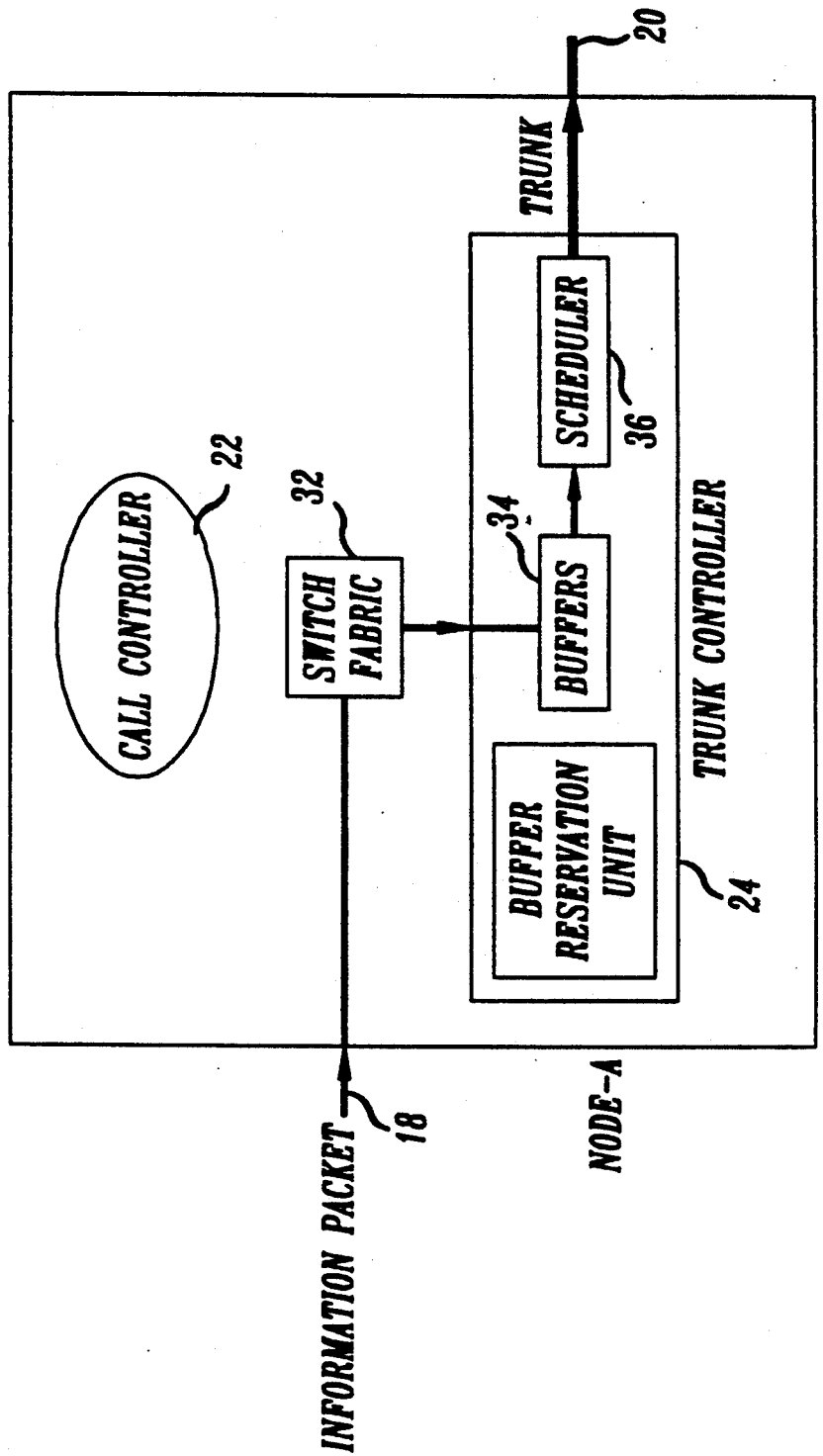
FIG. 16 illustrates message flow through one of the trunk controllers in the nodes of FIG. 1 in response to the appearance of information packets on one of the input trunks of the node.

FIG. 16 illustrates what happens in node A in response to the receipt of information packets after the call routing has been set up and an appropriate amount of bandwidth or buffer allocation has been completed. Information packets arrive on line 18, are transmitted through the switch fabric 32 in accordance with the routing determined by the call controller 22, and are sent to appropriate buffers 34 in the trunk controller 24. The information packets are then directed onto the trunk 20 via the operation of the scheduler 36 which causes appropriate emptying of the buffers in the trunk controller 24 onto the trunk 20.

Figure 17:
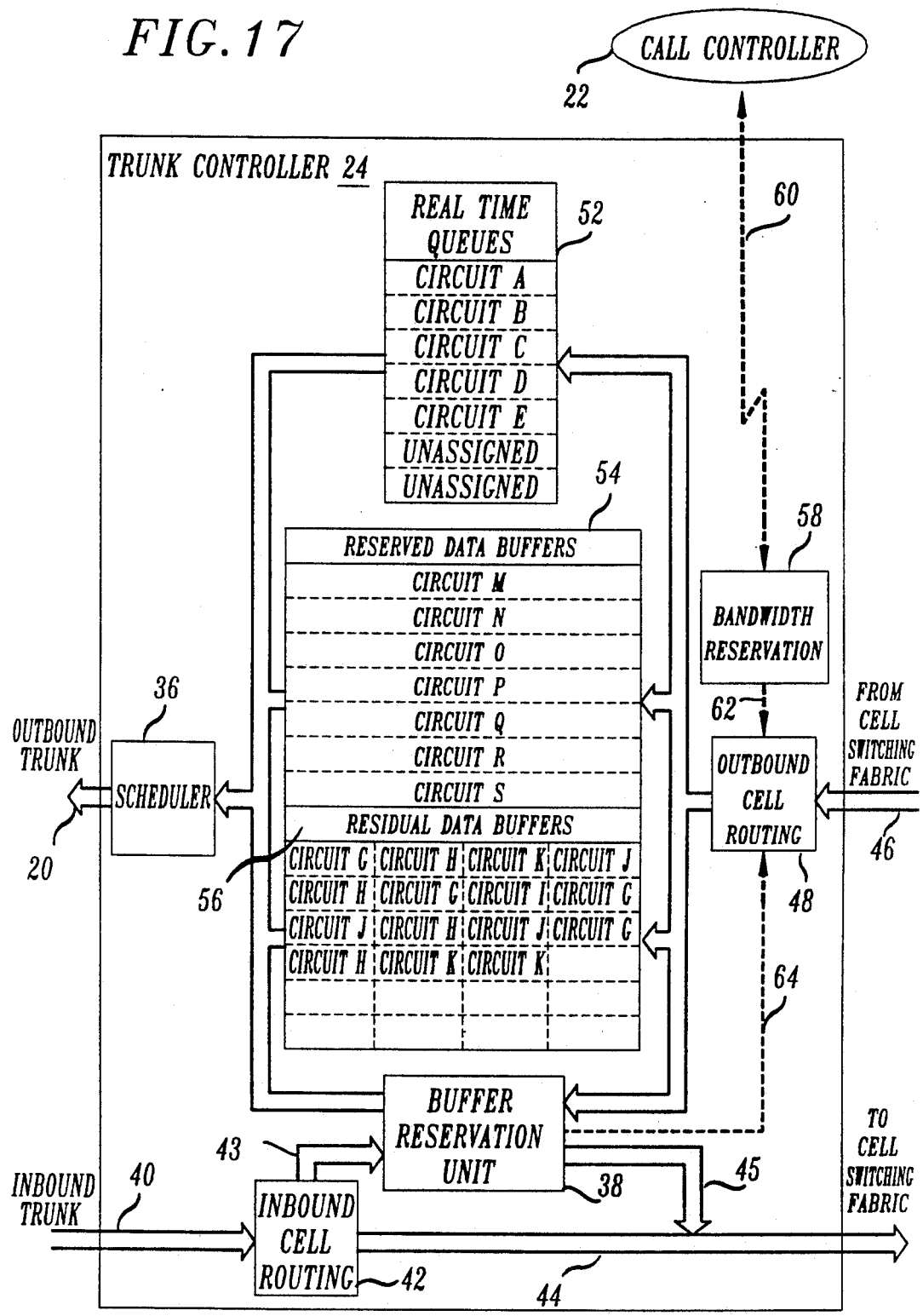
FIG. 17 is a detailed illustration of one of the trunk controllers is one of the nodes of FIG. 1.

FIG. 17 shows further details of the operation of one of the trunk controllers 24, the structure of the buffers in that trunk controller 24, and the routing of packets into the buffers. Packets come into the trunk controller 24 on an inbound data path 40. An inbound cell routing circuit 42 directs incoming packets which are not request acknowledgement packets 30 to data path 44 and to the cell switching fabric 32. Incoming packets, which are request acknowledgement packets 30, are sent via data path 43 to a buffer reservation unit 38, where they operate with respect to previous buffer allocation as described above and are then sent to the switching fabric via data paths 44 and 45. Packets passing through the switching fabric 32 arrive on a data path 46 at the input of an outbound cell routing circuit 48 which directs reservation packets 26 to a buffer reservation unit 38, information packets for real time transmissions to a group of real time queues 52, information packets for bursty transmissions to a group of reserved data buffers 54, and information packets for data transmissions not having stringent loss or delay requirements to a group of residual data buffers 56 left over after bandwidth and buffer reservations have been made. The data transmissions directed toward the residual buffers 56 are served on a "best efforts" basis and use the common pool of residual buffers. No efforts are made to reserve any buffers for these transmissions on an individual basis. The transmitters of such data may, when long transmissions are involved, request reserved buffers for the transmission.

The call controller 22 communicates with a bandwidth reservation circuit 58 via a control path 60. The bandwidth reservation circuit 58 communicates with the outbond cell routing circuit 48 via another control path 62. When a call arrives involving real time service requiring allocation of the bandwidth needed by the call for the entire duration of the call, the call controller 22 causes the bandwidth reservation circuit 58 to notify the outbound cell routing circuit 48 to set its logic so that it routes information packets of this type to appropriate queues in the group of real time queues 52, which are emptied onto the trunk 20 by the scheduler 36 so that the information packets for this kind of call are transmitted relatively smoothly over the outbound trunk 20 to achieve the jitter and delay constraints placed on this type of call.

The data traffic which gets reserved buffers equal to window size may be served by the scheduler 36 at a lower priority than the data traffic for real time services involving bandwidth reservation. The performance of the real time traffic, thus, will be unaffected by bursty data applications. Furthermore, the bandwidth which is left over after real time transmissions have been served can be utilized by the scheduler 36 for transmitting bursty data applications, which will keep the link utilization high and will result in efficient use of bandwidth resources. The buffers reserved for the bursty data virtual circuits may be served by the scheduler 36 in a strict round robin manner or in a weighted round robin manner which will result in fair sharing of the residual bandwidth left over after real time services have their bandwidth assigned.

When a buffer reservation packet 26 is received by the outbound cell routing circuit 48, it is directed by the logic of circuit 48 to the input of the buffer reservation unit 38 which then performs the previously described buffer reservation functions and notifies the outbound cell routing circuit 48 on a control path 64 to set its logic so that an appropriate amount of buffer capacity is allocated to the call corresponding to the reservation packet 26. As is apparent from FIG. 17, the buffer reservation unit 38 also forwards the reservation packet to the outbound trunk 20.

Figure 18:
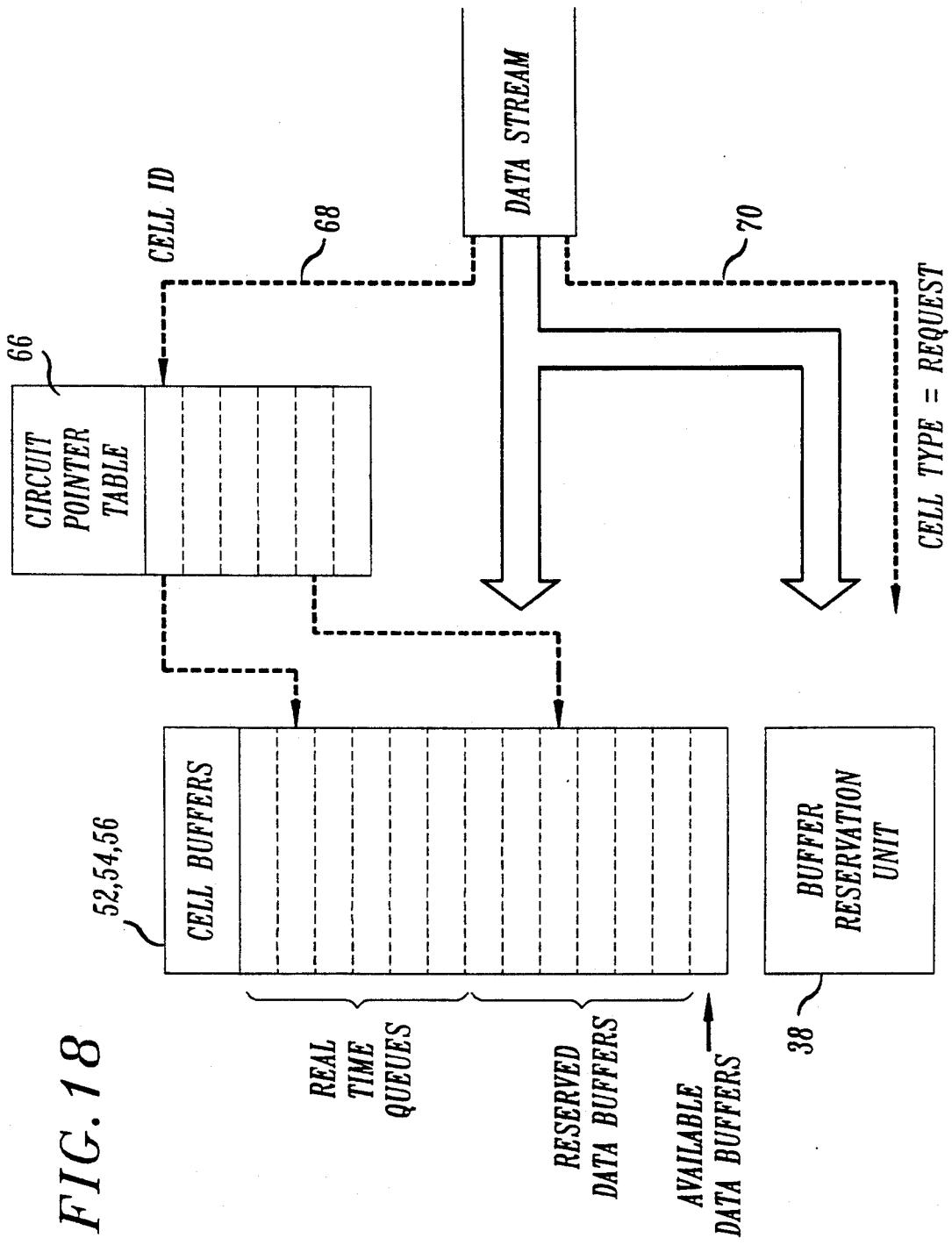
FIG. 18 is a detailed illustration of outbound packet routing in the trunk controller shown in FIG. 17.

FIG. 18 illustrates in more detail the outbound cell routing operation of circuit element 48. The packet identification associated with each information packet is directed to a circuit pointer table 66 via a control path 68. The circuit pointer table 66 causes the desired queues and buffers in the group of real time queues 52, the group of reserved data buffers 54, or the group of residual data buffers 56 to accept the information packet corresponding to the packet identification received on control path 68. When the packet type indicates that it is a buffer request packet, that information is communicated to the buffer reservation unit 38 via a control path 70 and the reservation packet is thereby accepted by the buffer reservation unit 38.

Figure 19:
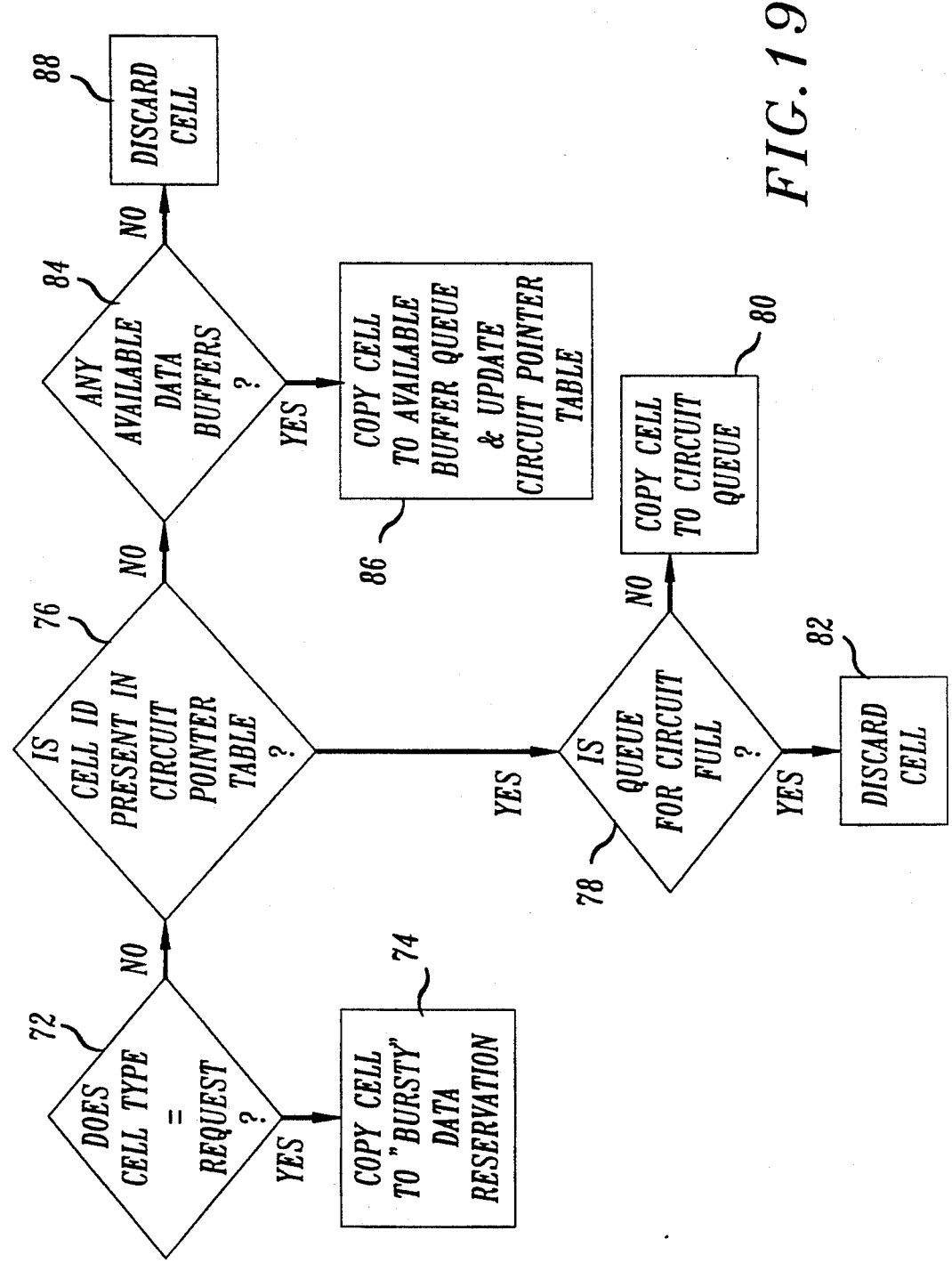
FIG. 19 is a flow chart further illustrating an outbound packet routing operation performed trunk controller of FIG. 17.

FIG. 19 is a flow chart illustrating the outbound packet routing operation of the trunk controller 24. First, a determination is made in block 72 as to whether the packet is a buffer request packet. If the packet is a buffer request packet, it is copied to the buffer reservation 50 in block 74. If the packet is not a buffer request packet, a determination is made in block 76 to see if the packet identification is present in the circuit pointer table 66. If such identification is present, block 78 checks to see if the queue associated with that circuit is full. If the queue is not full, the packet is copied to the appropriate circuit queue in block 80. If the queue is full, the packet is discarded in block 82.

If it is determined in block 76 that the packet identification is not in the circuit pointer table 66, then a decision is made in block 84 to see if there are any available data buffers and the circuit pointer table is updated. If there are available data buffers, block 86 causes the packet to be copied to the available buffers. If there are no available data buffers as determined in block 84, then the packet is discarded in block 88.

Figure 20:
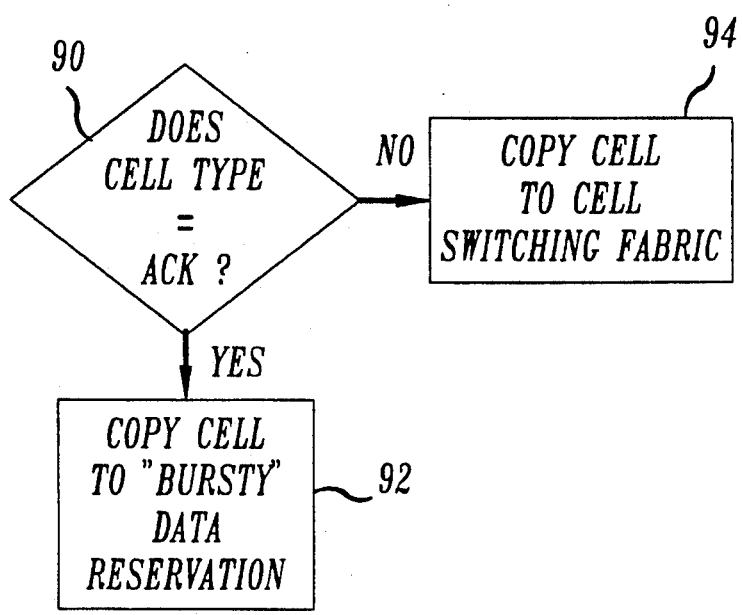
FIG. 20 is a flow chart illustrating the inbound packet routing operation in the trunk controller of FIG. 17.

FIG. 20 is a flow chart illustrating the inbound packet routing operation. A check is made in block 90 to see if the packet is an acknowledgement packet. If the packet is an acknowledgement packet, then it is copied to the buffer reservation unit 50 in block 92. If the packet is not an acknowledgement packet, the packet is copied to the switching fabric 32 in block 94.

We claim:

1. A packet switching system, comprising:
   an input for receiving calls, some of which are bursty transmissions and some of which are non-bursty transmissions;
   a plurality of outputs;
   a call controller means for:
   (a) routing a call received by the input to a selected one of the outputs,
   (b) identifying whether the received call is a bursty transmission or a non-bursty transmission,
   (c) reserving for the received call at least a first requested minimal amount of bandwidth on the selected one of the outputs needed to perform in-call buffer reservation in response to an identification that the call is a bursty transmission, and
   (d) reserving a predetermined second peak amount of bandwidth on the selected one of the outputs needed to transmit the call in response to an identification that the call is a non-bursty transmission; and
   a trunk controller means associated with the selected one of the outputs for:
   (a) reserving a requested amount of buffer space for the call in the trunk controller means in response to a buffer reservation packet in a call which is a bursty transmission, the buffer reservation being accomplished independent of the call routing, call identifying, and bandwidth reservation of the call controller means, and
   (b) placing data in a call which is a non-bursty transmission on the selected one of the outputs in accordance a first priority and placing data in a call which is a bursty transmission on the selected one of the outputs in accordance with a second priority less than the first priority.

2. The packet switching system of claim 1, in which the call controller means reserves a required bandwidth on the selected one of the outputs for a call which is a non-bursty transmission for the duration of the non-bursty transmission.

3. The packet switching system of claim 2, in which the non-bursty transmission is a voice transmission.

4. The packet switching system of claim 2, in which the non-bursty transmission is a video transmission.

5. The packet switching system of claim 2, in which the non-bursty transmission is a smooth data transmission.

6. The packet switching system of claim 1, in which the trunk controller means reserves an amount of buffer capacity in the trunk controller means corresponding to a requested transmission window for a call which is a bursty transmission.

7. The packet switching system of claim 6, in which the bursty transmission is a data transmission.

8. The packet switching system of claim 6, in which the trunk controller means is responsive to a buffer reservation request packet in a call which is a bursty transmission, which buffer reservation request packet contains a representation of a requested transmission window representing a requested allocation of buffer capacity in the trunk controller means.

9. The packet switching system of claim 8, in which the trunk controller means further comprises a means for determining if the trunk controller means has an unallocated amount of buffer capacity equal to or greater than the requested allocation and a means for allocating the requested buffer capacity if the unallocated capacity is greater than or equal to the requested capacity.

10. The packet switching system of claim 9, in which the trunk controller means comprises a means for overwriting the requested buffer allocation in the reservation packet with a representation of a smaller amount of requested buffer capacity in response to a determination that the trunk controller means has an unallocated amount of buffer capacity less than the allocation originally requested in the reservation packet.

11. The packet switching system of claim 10, in which the trunk controller means further comprises a means responsive to an acknowledgement packet for deallocating buffer capacity.

12. The packet switching system of claim 2, in which the trunk controller means comprises a means for scheduling transmission of packets on the selected one of the outputs.

13. The packet switching system of claim 12, in which the scheduling means schedules transmission of packets for a call which is a bursty transmission in round robin fashion, whereby residual bandwidth remaining after transmission of packets for calls which are non-bursty transmissions is automatically shared in an equitable manner by calls which are bursty transmissions.

14. The packet switching system of claim 12, in which the scheduling means transmits packets on the selected one of the outputs so as to avoid jitter and delay for calls which are non-bursty transmissions.

15. The packet switching system of claim 12, in which the scheduling means transmits packets on the selected one of the outputs so as to avoid packet loss for calls which are bursty transmissions.

16. A method of handling calls in a packet telecommunications system, comprising the steps of:
   receiving calls at an input, some of which are bursty transmissions and some of which are non-bursty transmissions;
   in a call controller:
   (a) routing a call received at the input to a selected one of a plurality of outputs,
   (b) identifying whether the received call is a bursty transmission or a non-bursty transmission,
   (c) reserving for the received call at least a first requested minimal amount of bandwidth on the selected one of the outputs needed to perform in-call buffer reservation in response to an identification that the call is a bursty transmission, and
   (d) reserving a predetermined second peak amount of bandwidth on the selected one of the outputs needed to transmit the call in response to an identification that the call is a non-bursty transmission; and
   in a trunk controller associated with the selected one of the outputs:
   (a) reserving a requested amount of buffer space for the call in the trunk controller in response to a buffer reservation packet in a call which is a bursty transmission, the buffer reservation being accomplished independent of the call routing, call identifying, and bandwidth reservation of the call controller, and
   (b) placing data in a call which is a non-bursty transmission on the selected one of the outputs in accordance a first priority and placing data in a call which is a bursty transmission on the selected one of the outputs in accordance with a second priority less than the first priority.

17. A packet switching system, comprising:
   an input for receiving calls requiring different qualities of service;
   a plurality of outputs;
   a call controller means for:
   (a) routing a call received from the input to a selected one of the outputs,
   (b) detecting a required bandwidth indication and a quality of service designator in a call setup packet associated with the call, and
   (c) selectively reserving one of:
      (1) a first predetermined minimal amount of bandwidth on the predetermined one of the outputs needed to perform in-call buffer reservation and
      (2) a second predetermined peak amount of bandwidth on the predetermined one of the outputs needed to transmit the call in response to the detected required bandwidth indication and the quality of service designator; and
   a trunk controller means associated with the selected one of the outputs:
   (a) for receiving a buffer reservation packet associated with a call for which the first predetermined amount of bandwidth has been reserved by the call controller means and reserving a predetermined amount of buffer space for the call in the trunk controller means in response to the buffer reservation packet, the buffer space reservation being accomplished by the trunk controller means independent of the call routing, required bandwidth indication and quality of service designator detection, and selective bandwidth reservation performed by the call controller means, and
   (b) for placing data associated with a call for which the second predetermined peak amount of bandwidth has been reserved on the selected one of the outputs in accordance with a first priority and placing data associated with a call for which the first predetermined minimal amount of bandwidth has been reserved on the selected one of the outputs in accordance with a second priority less than the first priority.

18. The packet switching system of claim 17, in which the call controller means reserves a required bandwidth on the selected one of the outputs for a call for which the second predetermined peak amount of bandwidth has been reserved.

19. The packet switching system of claim 18, in which the second predetermined peak amount of bandwidth is reserved for voice calls.

20. The packet switching system of claim 18, in which the second predetermined peak amount of bandwidth is reserved for video calls.

21. The packet switching system of claim 18, in which the second predetermined peak amount of bandwidth is reserved for smooth data calls.

22. The packet switching system of claim 17, in which the trunk controller means reserves an amount of buffer capacity in the trunk controller means corresponding to a requested transmission window for a call for which the first predetermined minimal amount of bandwidth has been reserved.

23. The packet switching system of claim 22, in which the call for which the first predetermined minimal amount of bandwidth has been reserved is a data transmission.

24. The packet switching system of claim 22, in which the trunk controller means is responsive to a buffer reservation request packet in a call for which the first predetermined minimal amount of bandwidth has been reserved, which buffer reservation request packet contains a representation of a requested transmission window representing a requested allocation of buffer capacity in the trunk controller means.

25. The packet switching system of claim 24, in which the trunk controller means further comprises a means for determining if the trunk controller means has an unallocated amount of buffer capacity equal to or greater than the requested allocation and a means for allocating the requested buffer capacity if the unallocated capacity is greater to or equal to the requested capacity.

26. The packet switching system of claim 25, in which the trunk controller means comprises a means for overwriting the requested buffer allocation in the reservation packet with a representation of a smaller amount of requested buffer capacity in response to a determination that the trunk controller means has an unallocated amount of buffer capacity less than the allocation originally requested in the reservation packet.

27. The packet switching system of claim 26, in which the trunk controller means further comprises a means responsive to an acknowledgment packet for deallocating buffer capacity.

28. The packet switching system of claim 18, in which the trunk controller means comprises a means for scheduling transmission of packets on the selected one of the outputs.

29. The packet switching system of claim 28, in which the scheduling means schedules transmission of packets for a call for which the first predetermined minimal amount of bandwidth has been reserved in round robin fashion, whereby residual bandwidth remaining after transmission of packets for calls for which the second predetermined peak bandwidth has been reserved is automatically shared in an equitable manner by calls for which the first predetermined minimal amount of bandwidth has been reserved.

30. The packet switching system of claim 28, in which the scheduling means transmits packets on the selected one of the outputs so as to avoid jitter and delay for calls for which the second predetermined peak amount of bandwidth has been reserved.

31. The packet switching system of claim 28, in which the scheduling means transmits packets on the selected one of the outputs so as to avoid packet loss for calls for which the first predetermined minimal amount of bandwidth has been reserved.

32. A method of handling calls in a packet telecommunications system, comprising the steps of:
receiving calls requiring different qualities of service at an input;
in a call controller:
(a) routing a call received from the input to a selected one of a plurality of outputs,
(b) detecting a required bandwidth indication and a quality of service designator in a call setup packet associated with the call, and
(c) selectively reserving one of:
(1) a first predetermined minimal amount of bandwidth on the predetermined one of the outputs needed to perform in-call buffer reservation and
(2) a second predetermined peak amount of bandwidth on the predetermined one of the outputs needed to transmit the call in response to detecting the required bandwidth indication and the quality of service designator; and
in a trunk controller associated with the selected one of the outputs:
(a) receiving a buffer reservation packet associated with a call for which the first predetermined amount of bandwidth has been reserved by the call controller and reserving a predetermined amount of buffer space for the call in the trunk controller in response to the buffer reservation packet, the buffer space reservation being accomplished by the trunk controller independent of the call routing, required bandwidth indication and quality of service designator detection, and selective bandwidth reservation performed by the call controller, and
(b) placing data associated with a call for which the second predetermined peak amount of bandwidth has been reserved on the selected one of the outputs in accordance with a first priority and placing data associated with a call for which the first predetermined minimal amount of bandwidth has been reserved on the selected one of the outputs in accordance with a second priority less than the first priority.

33. A packet switching system, comprising:
an input for receiving first calls which are real time transmissions, second calls which are bursty transmissions, and third calls which do not have stringent loss or delay requirements;
a plurality of outputs;
a call controller means for:
(a) routing a call received by the input to a selected one of the outputs,
(b) identifying whether the received call is a first call, a second call, or a third call,
(c) reserving for the received call at least a first predetermined minimal amount of bandwidth on the predetermined one of the outputs needed to perform in-call buffer reservation in response to an identification that the call is a second call, and
(d) reserving a predetermined second peak amount of bandwidth on the predetermined one of the outputs needed to transmit the call in response to an identification that the call is a first call; and
a trunk controller means associated with the selected one of the outputs comprising:

(a) a variable capacity real time queing means for receiving data relating to the first calls,
(b) a variable capacity reserved data buffering means for receiving data relating to the second calls,
(c) a variable capacity unreserved residual data buffering means for receiving data relating to the third calls,
(d) a buffer reservation unit for receiving a buffer reservation packet in a second call for reserving a predetermined amount of buffer space in the reserved data buffering means for the call, the buffer reservation being accomplished independent of the call routing, call identifying, and bandwidth reservation of the call controller, and
(e) a scheduling means for placing data on the predetermined one of the outputs from the real time queuing means in accordance with a first priority, from the reserved data buffering means in accordance with a second priority less than the first priority, and from the residual data buffering means on a best efforts basis.

34. A method of handling calls in a packet telecommunications system, comprising the steps of:
receiving at an input first calls which are real time transmissions, second calls which are bursty transmissions, and third calls which do not have stringent loss or delay requirements;
in a call controller:
(a) routing a call received at the input to a selected one of a plurality of outputs,
(b) identifying whether the received call is a first call, a second call, or a third call,
(c) reserving for the received call at least a first predetermined minimal amount of bandwidth on the predetermined one of the outputs needed to perform in-call buffer reservation in response to an identification that the call is a second call, and
(d) reserving a predetermined second peak amount of bandwidth on the predetermined one of the outputs needed to transmit the call in response to an identification that the call is a first call; and
in a trunk controller associated with the selected one of the outputs:
(a) receiving data relating to the first calls in a variable capacity real time queuing means,
(b) receiving data relating to the second calls in a variable capacity reserved data buffering means,
(c) receiving data relating to the third calls in a variable capacity unreserved residual data buffering means,
(d) receiving in a buffer reservation unit a buffer reservation packet in a second call for reserving a predetermined amount of buffer space in the reserved data buffering means for the call, the buffer reservation being accomplished independent of the call routing, call identifying, and bandwidth reservation of the call controller, and
(e) placing data on the predetermined one of the outputs from the real time queuing means in accordance with a first priority, from the reserved data buffering means in accordance with a second priority less than the first priority, and from the residual data buffering means on a best efforts basis.

* * * * *